United States Patent
Dong et al.

(10) Patent No.: US 12,053,938 B2
(45) Date of Patent: Aug. 6, 2024

(54) SYSTEM AND METHOD FOR FORMING A COMPOSITE STIFFENER

(71) Applicant: The Boeing Company, Chicago, IL (US)

(72) Inventors: Shuonan Dong, Newcastle, WA (US); Marko Oviir, Seattle, WA (US); Nicholas A. Boroughs, Seattle, WA (US)

(73) Assignee: The Boeing Company, Arlington, VA (US)

( * ) Notice: Subject to any disclaimer, the term of this patent is extended or adjusted under 35 U.S.C. 154(b) by 46 days.

(21) Appl. No.: 17/701,790

(22) Filed: Mar. 23, 2022

(65) Prior Publication Data

US 2022/0314556 A1 Oct. 6, 2022

Related U.S. Application Data

(60) Provisional application No. 63/170,608, filed on Apr. 5, 2021.

(51) Int. Cl.
*B29C 70/30* (2006.01)
*B29C 70/54* (2006.01)
*B29L 31/30* (2006.01)

(52) U.S. Cl.
CPC ............. *B29C 70/30* (2013.01); *B29C 70/54* (2013.01); *B29C 70/545* (2013.01); *B29L 2031/3076* (2013.01)

(58) Field of Classification Search
None
See application file for complete search history.

(56) References Cited

U.S. PATENT DOCUMENTS

| | | | |
|---|---|---|---|
| 9,643,395 B2 | 5/2017 | Kline et al. | |
| 9,993,980 B2 | 6/2018 | Kline et al. | |
| 10,105,942 B2 | 10/2018 | Castorina et al. | |
| 11,524,468 B2 * | 12/2022 | Ward | B29C 70/34 |
| 2020/0139646 A1 | 5/2020 | Spencer et al. | |

OTHER PUBLICATIONS

European Patent Office, Extended European Search Report, App. No. 22163297.9 (Aug. 25, 2022).

* cited by examiner

*Primary Examiner* — Barbara J Musser
(74) *Attorney, Agent, or Firm* — Walters & Wasylyna LLC

(57) ABSTRACT

A system for forming a composite stiffener includes a support surface to support a composite sheet and a sheet-locating device to locate the composite sheet such that a first sheet-portion is supported on the support surface and a second sheet-portion extends beyond the support surface. The system includes a separation device to separate the second sheet-portion from the first sheet-portion to at least partially form a composite charge. The system includes a layup tool including a longitudinal tool-axis and a layup surface configured to receive the composite charge. The layup surface includes a curvature along the longitudinal tool-axis. The system includes a compaction device to compact the composite charge on the layup surface. The system includes a tool-positioning device to position of the layup tool such that a compaction force, applied to the composite charge by the compaction device, is normal to the layup surface.

20 Claims, 13 Drawing Sheets

SYSTEM AND METHOD FOR FORMING A COMPOSITE STIFFENER

PRIORITY

This application claims priority from U.S. Ser. No. 63/170,608 filed on Apr. 5, 2021.

FIELD

The present disclosure relates generally to composite manufacturing and, more particularly, to systems and methods for forming a composite stiffener.

BACKGROUND

Structural assemblies often include a panel that is stiffened by a stiffener. Examples of such stiffened structural assemblies include aircraft structures in which there is a desire that the aircraft structure be capable of reacting to loads in a variety of different directions. For example, it is desirable for an aircraft wing or wing-like stabilizer to be capable of reacting to aerodynamic loads, such as bending loads, that are imposed on the wing or stabilizer during flight. Generally, these wing structures include a skin panel that is stiffened by one or more stiffeners. Bending loads applied to the wing structure are reacted by the stiffeners. However, depending on the cross-sectional geometry of the stiffener, it can be complicated to interface the stiffener with other components of the stiffened structural assembly, such as ribs, spars, and/or an opposing skin panel of the wing structure.

Stiffeners are often composite laminate structures in which elongated strips of a composite material are placed, or stacked, on a layup surface. The composite stiffener is then bonded, or otherwise joined, to a surface of the panel being stiffened. However, depending on the configuration and/or geometry of the composite stiffener being formed and/or the configuration and/or geometry of the panel being stiffened, it can be complicated and/or time consuming to properly form and place each one of the elongated strips of composite material.

Thus, there is a need for a system and method for forming a composite stiffener, or other elongated composite structure, that take into account at least some of the issues discussed above. Accordingly, those skilled in the art continue with research and development efforts in the field of composite manufacturing.

SUMMARY

Disclosed are examples of a system for forming a composite stiffener and a method of forming a composite stiffener. The following is a non-exhaustive list of examples, which may or may not be claimed, of the subject matter according to the present disclosure.

In an example, the disclosed system includes a support surface configured to support a composite sheet. The system further includes a sheet-locating device configured to selectively locate the composite sheet such that a first sheet-portion of the composite sheet is supported on the support surface and a second sheet-portion of the composite sheet extends beyond the support surface. The system also includes a separation device configured to separate the second sheet-portion from the first sheet-portion to at least partially form a composite charge. The system additionally includes a layup tool including a longitudinal tool-axis and a layup surface configured to receive the composite charge. The layup surface includes a curvature along the longitudinal tool-axis. The system further includes a compaction device configured to compact the composite charge on the layup surface. The system also includes a tool-positioning device coupled to the layup tool and configured to selectively position the layup tool such that a compaction force, applied to the composite charge by the compaction device, is normal to the layup surface.

In another example, the system includes a support surface configured to support a composite sheet and including a support-surface edge. The system further includes a sheet-locating device configured to selectively locate the composite sheet such that a first sheet-portion of the composite sheet is supported on the support surface and a second sheet-portion of the composite sheet extends past the support-surface edge. The system also includes a separation device configured to separate the second sheet-portion from the first sheet-portion and to separate a third sheet-portion of the composite sheet from the second sheet-portion to form a composite charge. The system additionally includes a layup tool including a longitudinal tool-axis and a layup surface configured to receive the composite charge. The layup surface includes a curvature along the longitudinal tool-axis. The system further includes a compaction device configured to compact the composite charge on the layup surface. The system also includes a tool-positioning device coupled to the layup tool and configured to selectively position the layup tool. The system additionally includes a motion-control device configured to selectively control the tool-positioning device to adjust the position of the layup tool relative to the compaction device as the compaction device compacts the composite charge on the layup surface such that a compaction force, applied to the composite charge by the compaction device, is normal to the layup surface.

In an example, the disclosed method includes steps of: (1) locating a composite sheet on a support surface such that a first sheet-portion of the composite sheet is supported on the support surface and a second sheet-portion of the composite sheet extends beyond the support surface; (2) separating the second sheet-portion from the first sheet-portion to at least partially form a composite charge; (3) transferring the composite charge onto a layup surface of a layup tool, wherein the layup surface includes a curvature along a longitudinal tool-axis of the layup tool; (4) selectively positioning the layup tool relative to a compaction device such that a compaction force, applied to the composite charge by the compaction device, is normal to the layup surface; and (5) compacting the composite charge on the layup surface to form a portion of the composite stiffener.

Other examples of the disclosed system and method will become apparent from the following detailed description, the accompanying drawings, and the appended claims.

DETAILED DESCRIPTION

Figure 1:
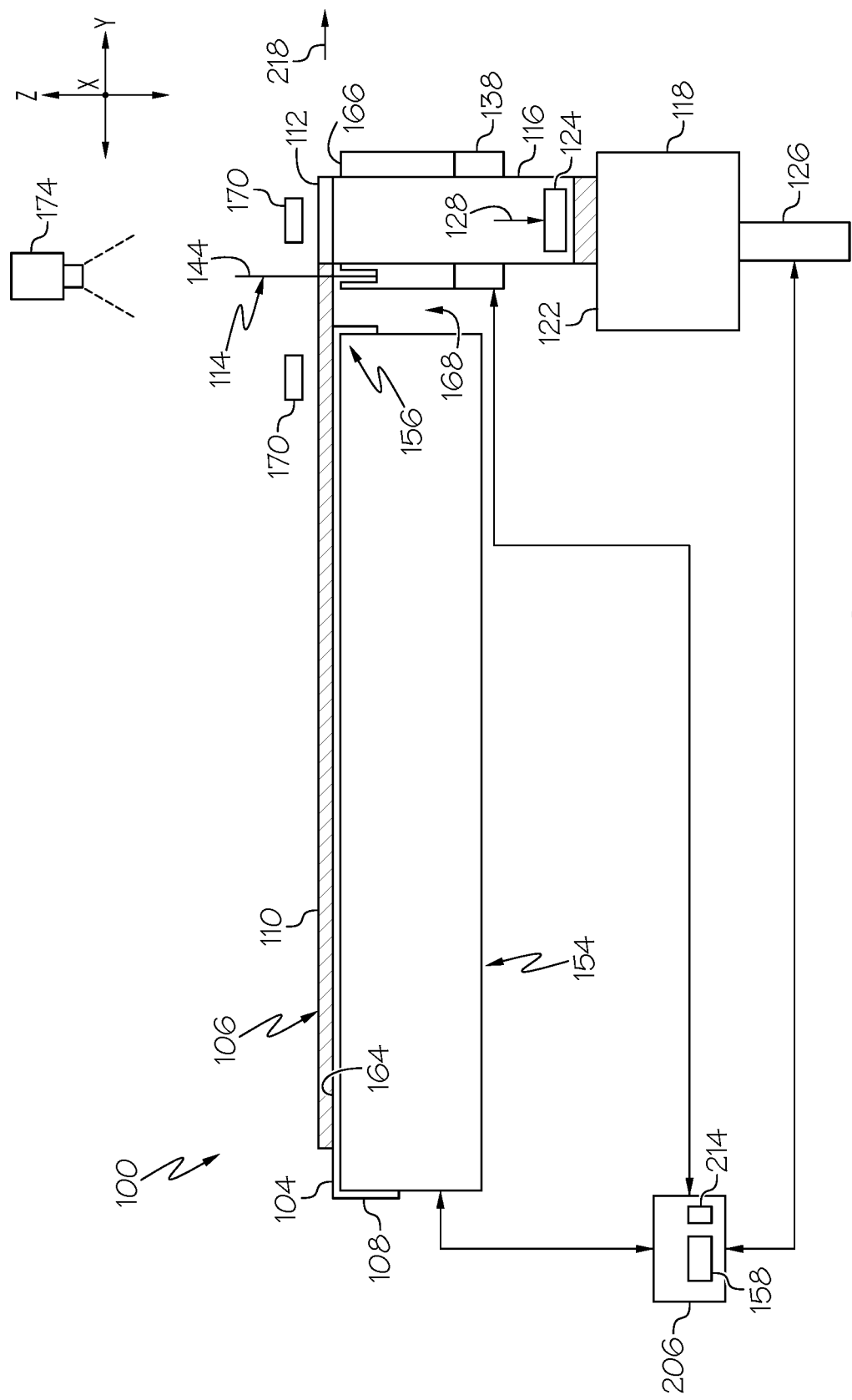
FIG. 1 is a schematic end view of an example of a system for forming a composite stiffener.

Referring to FIGS. 1-15, by way of examples, the present disclosure is directed to a system 100 for forming a composite stiffener 102. Referring to FIG. 16, by way of examples, the present disclosure is further directed to a method 1000 of forming the composite stiffener 102. In one or more examples, implementations of the system 100 and the method 1000 are utilized to form and place a number of composite charges 116 utilized to form the composite stiffener 102.

The present disclosure recognizes that one key difficulty in the manufacture of long, narrow composite parts is in placing short courses of composite material in non-zero orientations, such as at ±45° and/or 90° orientations, which requires laying and cutting many times, thereby making the manufacturing process slow and costly. The long 0° material are the easiest to place since the layup machine just travels straight down the length of the stiffener without stopping. The system 100 and method 1000 disclosed herein advantageously facilitates wider expanses of composite material to be used, in which case the 45° and 90° orientations are longer and thus more efficiently dispensed, and then facilitates narrow strips to be cut out of that wide composite material in order to create the long, narrow stiffener.

Referring generally to FIGS. 1-4, which schematically illustrate examples of the system 100. In one or more examples, the system 100 includes a support surface 104, a sheet-locating device 108, a separation device 114, a layup tool 118, a compaction device 124, and a tool-positioning device 126.

In one or more examples, during operation of system 100, a composite sheet 106 is located and/or placed on the support surface 104. Subsequently, the sheet-locating device 108 is utilized to operatively move (e.g., translate) the composite sheet 106 such that a first sheet-portion 110 of the composite sheet 106 is supported on the support surface 104 and a second sheet-portion 112 of the composite sheet 106 extends beyond the support surface 104. Subsequently, the separation device 114 separates the second sheet-portion 112 from the first sheet-portion 110 to, at least partially, form the composite charge 116. Optionally, the separation device 114 also separates a third sheet-portion 148 (e.g., as shown in FIGS. 3, 4, 8 and 10) from the second sheet-portion 112 to form the composite charge 116. Subsequently, the compaction device 124 compacts the composite charge 116 onto a layup surface 122 of the layup tool 118. Substantially concurrent with the composite charge 116 being compacted onto the layup surface 122, the tool-positioning device 126 positions the layup tool 118 such that a compaction force 128, applied to the composite charge 116 by the compaction device 124, is normal to the layup surface 122.

Figure 12:
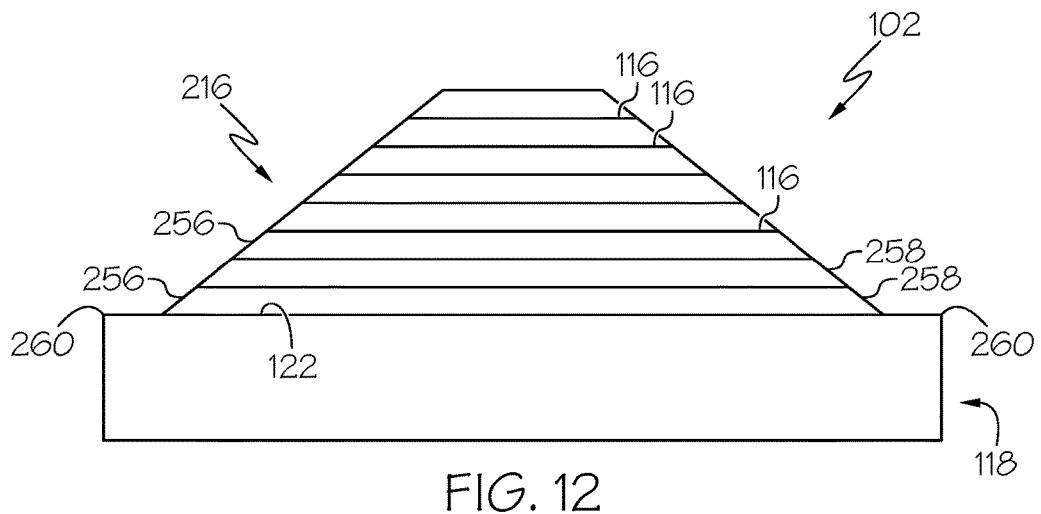
FIG. 12 is a schematic end view of an example of a composite stiffener.
Figure 13:
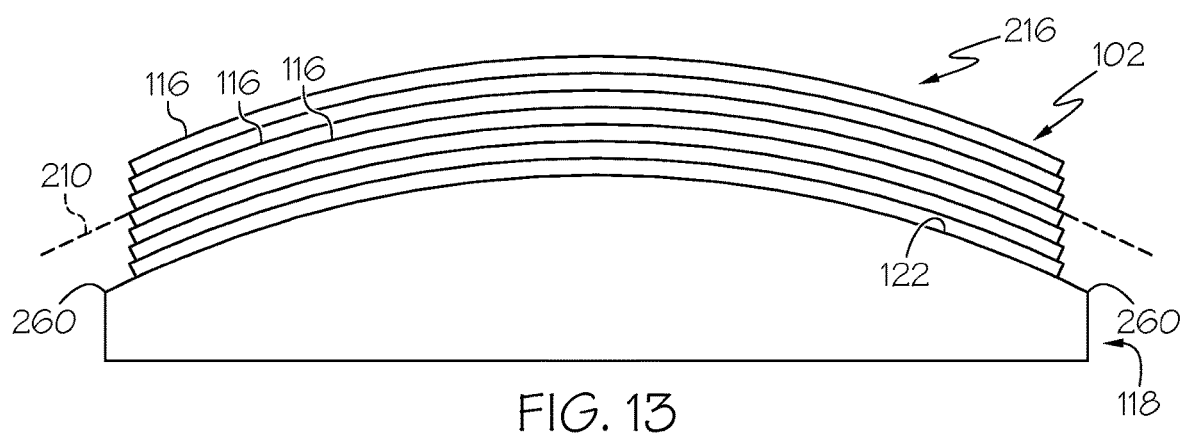
FIG. 13 is a schematic side view of an example of the composite stiffener.
Figure 14:
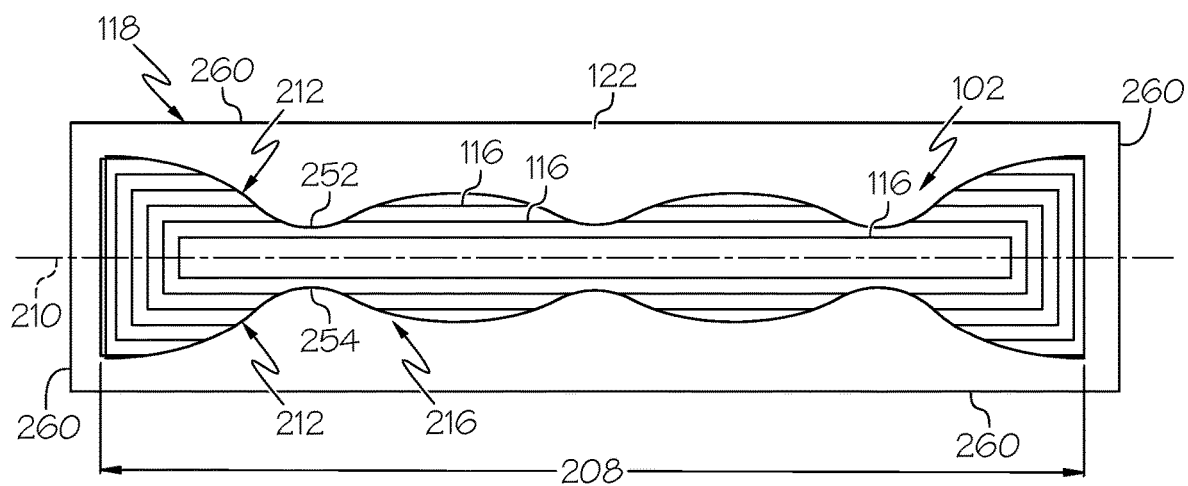
FIG. 14 is a schematic top view of an example of the composite stiffener.
Figure 18:
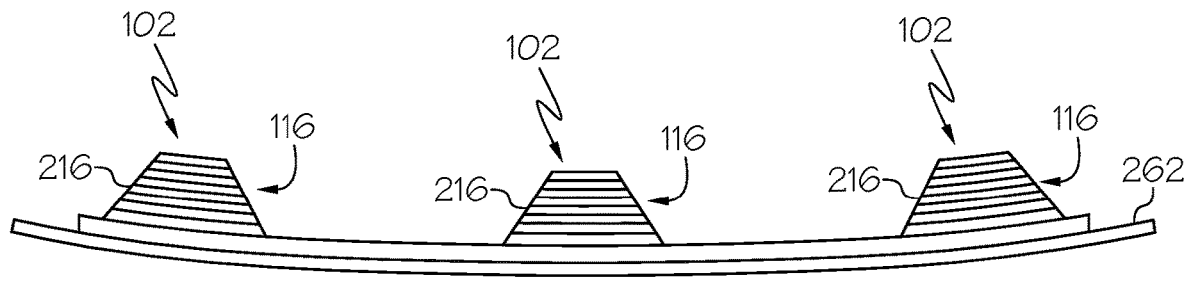
FIG. 18 is a schematic end view of an example of a plurality of composite stiffeners positioned on a panel.

In one or more examples, the system 100 and method 1000 facilitate a cut/align/stack process to manufacture the composite stiffener 102 (e.g., as shown in FIGS. 12-14 and 18). For example, implementations of the system 100 and/or method 1000 are utilized to cut a plurality of composite charges 116 (e.g., strips of composite material), to align each one of the plurality of composite charges 116 with the layup tool 118 or with a previously laid composite charge 116, and to stack each one of the plurality of composite charges 116 on the layup surface 122 of the layup tool 118 or on the previously laid strip of composite material. Accordingly, in one or more examples, implementations of the system 100 and/or method 1000 produce a full-stack stiffener (e.g., as shown in FIGS. 12-14) that is ready for placement onto another structure (e.g., as shown in FIG. 18).

The support surface 104 is configured to support the composite sheet 106. In one or more examples, the support surface 104 is configured to support the composite sheet 106 during formation of the composite sheet 106 and/or prior to selectively locating the composite sheet 106 to form the composite charge 116. In one or more examples, during operation of the system 100, the support surface 104 is configured to support the first sheet-portion 110 to permit separation of the second sheet-portion 112 from the first sheet-portion 110 to, at least partially, form the composite charge 116.

The sheet-locating device 108 is configured to selectively locate the composite sheet 106. The composite sheet 106 is selectively located using the sheet-locating device 108 such that the first sheet-portion 110 of the composite sheet 106 is supported on the support surface 104 and the second sheet-portion 112 of the composite sheet 106 extends beyond the support surface 104. This may include operative translation of the composite sheet 106 such that the second sheet-portion 112 extends, or is cantilevered, past the support surface 104 (e.g., as illustrated by directional arrow 218 in FIGS. 1, 3 and 11). The sheet-locating device 108 includes any suitable structure or mechanism that is capable of being utilized to selectively extend the second sheet-portion 112 past the support-surface edge 156. Examples, of the sheet-locating device 108 include, but are not limited to, actuators, conveyors, servomotors, rollers, a robotic arm, a selectively moveable platform, and the like. In one or more examples, the sheet-locating device 108 is electronically operated and/or controlled in any suitable manner, such as via receipt of a control signal from a controller 206.

In one or more examples, the support surface 104 includes a support-surface edge 156. The sheet-locating device 108 is configured to selectively locate the composite sheet 106 such that the first sheet-portion 110 of the composite sheet 106 is supported on the support surface 104 and the second sheet-portion 112 of the composite sheet 106 extends past the support-surface edge 156. For example, during operation of the system 100, the sheet-locating device 108 is configured to selectively and/or repeatedly extend, or cantilever, the second sheet-portion 112 past, over, and/or across the support-surface edge 156 to permit separation of the second sheet-portion 112 from the first sheet-portion 110.

The separation device 114 is configured to separate the second sheet-portion 112 from the first sheet-portion 110 to, at least partially, form the composite charge 116. Separation of the second sheet-portion 112 from the first sheet-portion 110 creates a strip of composite material (e.g., a strip from the composite sheet 106). The strip of composite material, at least partially, forms the composite charge 116. The composite charge 116 is utilized to form at least a portion of the composite stiffener 102.

The separation device 114 includes, or takes the form of, any suitable structure or mechanism that is configured to cut, sever, slit, divide, or otherwise separate the second sheet-portion 112 from the first sheet-portion 110. The separation device 114 is configured and/or located such that a separating (e.g., cutting) action extends entirely through the composite sheet 106 (e.g., through a thickness of the composite sheet 106) when the separation device 114 is separating the second sheet-portion 112 from the first sheet-portion 110.

The layup tool 118 includes the layup surface 122. The layup tool 118 includes, or takes the form of, any structure or mechanism configured to form or support the layup surface 122. The layup surface 122 is configured to receive the composite charge 116. The layup surface 122 includes, or takes the form of, any suitable structure or surface that is configured to support the composite charge 116 during layup and compaction. In one or more examples, after separation of the composite charge 116 from the composite sheet 106, the composite charge 116 is conveyed, transferred, or placed on the layup surface 122 of the layup tool 118. For example, the composite charge 116 is aligned with and placed on the layup surface 122 after the second sheet-portion 112 is separated from the first sheet-portion 110 and after the third sheet-portion 148 is separated from the second sheet-portion 112 (e.g., when performed).

Figure 2:
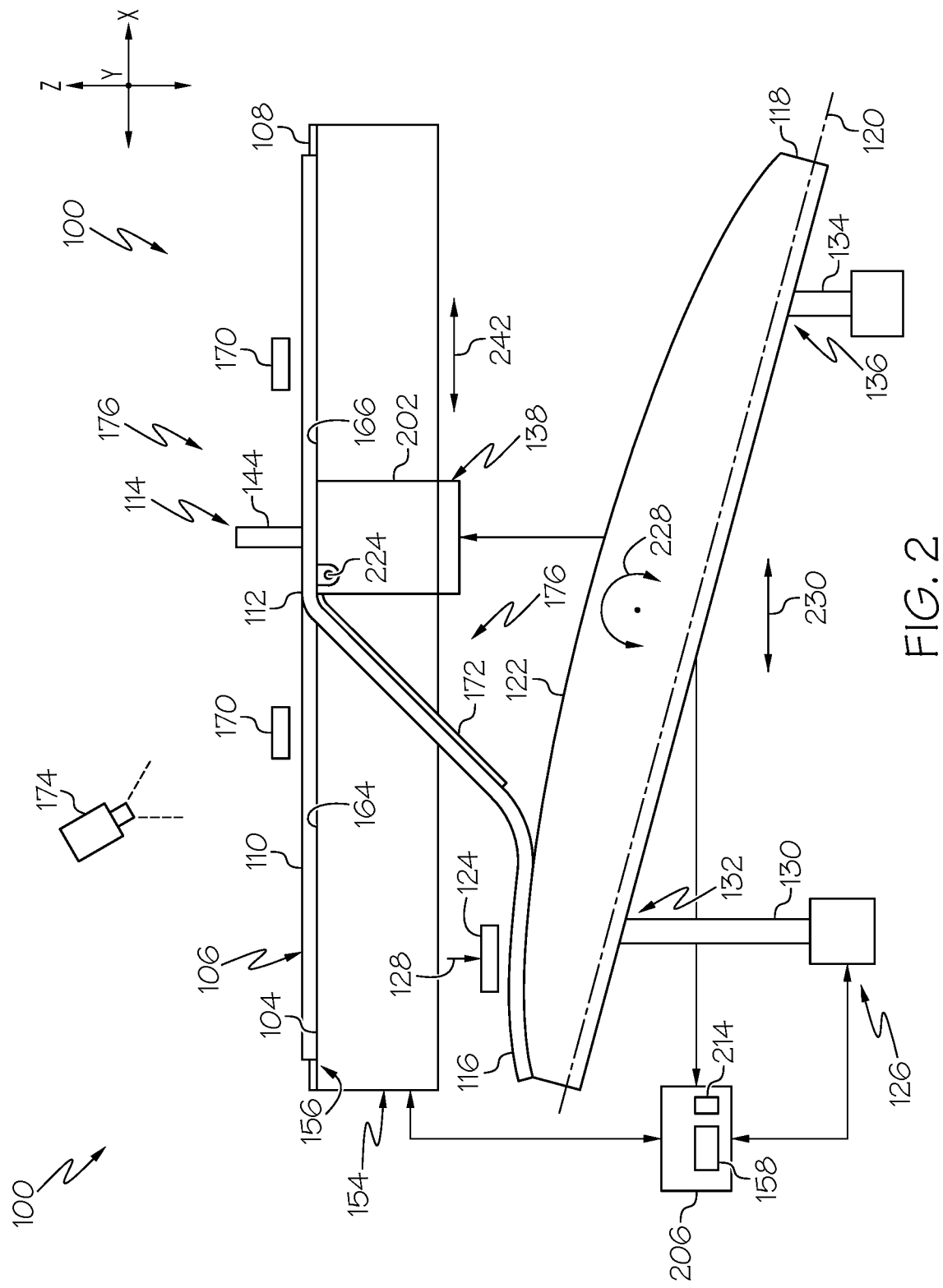
FIG. 2 is a schematic side view of an example of the system.
Figure 4:
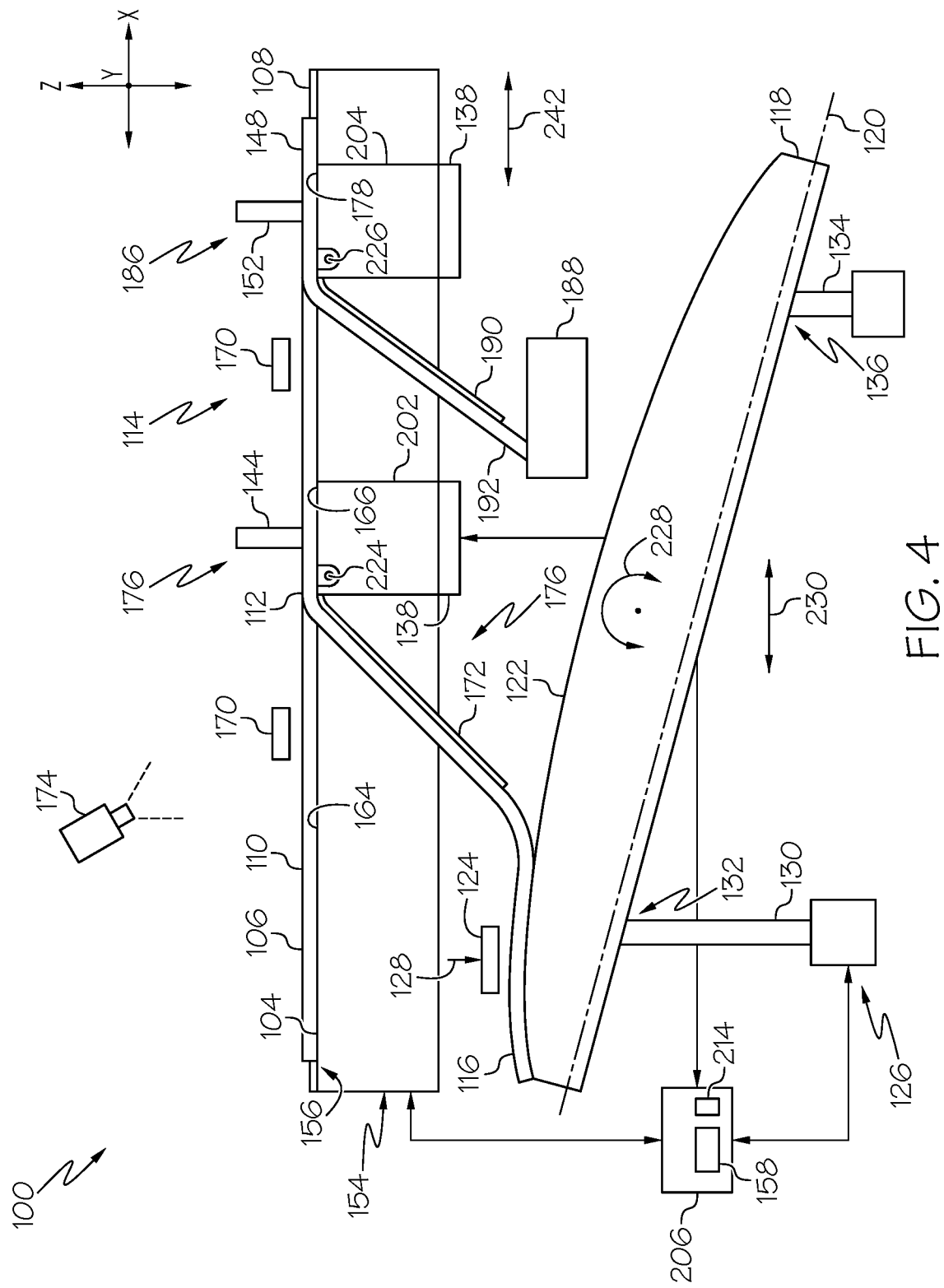
FIG. 4 is a schematic side view of an example of the system.

The layup tool 118 includes a longitudinal tool-axis 120 (e.g., as shown in FIGS. 2 and 4). In one or more examples, the layup surface 122 includes a curvature along the longitudinal tool-axis 120 of the layup tool 118. The layup surface 122 includes any suitable curvature. The curvature of the layup surface 122 imparts a corresponding or complementary curvature to the composite charge 116 that is placed and compacted on the layup surface 122 and, thus, imparts a curvature to the composite stiffener 102 formed from a stack 216 of composite charges 116 (e.g., as shown in FIG. 13). In one or more examples, the layup surface 122 is located vertically below the support surface 104 when the layup surface 122 is receiving the composite charge 116.

The compaction device 124 is configured to compact the composite charge 116 on the layup surface 122. The compaction device 124 includes, or takes the form of, any structure or mechanism that is configured to apply the compaction force 128 (e.g., as shown in FIGS. 1-7) that compacts the composite charge 116 on the layup surface 122 and/or onto another (e.g., previously placed) composite charge 116 that is present on the layup surface 122. In one or more examples, the compaction device 124 is configured to move (e.g., translate) with the separation device 114 when the composite charge 116 is separated from the composite sheet 106, such as when the second sheet-portion 112 is separated from the first sheet-portion 110 and the third sheet-portion 148 is separated from the second sheet-portion 112 (e.g., when performed). In one or more examples, the compaction device 124 includes, or takes the form of, at least one compacting roller. In one or more examples, the compaction device 124 is an electronically actuated compaction device and the controller 206 controls the operation of compaction device 124. For example, a pressure (e.g., the compaction force 128) applied to the composite charge 116 by compaction device 124 and/or a time that compaction device 124 compacts the composite charge 116 is selected, regulated, and/or controlled by the controller 206.

The tool-positioning device 126 is coupled to the layup tool 118. The tool-positioning device 126 is configured to selectively position of the layup tool 118. The layup tool 118 is selectively positioned (e.g., located and angularly oriented in space) such that the compaction force 128, applied to the composite charge 116 by the compaction device 124, is normal to the layup surface 122. The tool-positioning device 126 includes, or takes the form of, any structure or mechanism that is configured rotationally move and/or linearly move the layup tool 118 in space. Examples, of the tool-positioning device 126 include, but are not limited to, one or more linear actuators, one or more rotary actuators, servo-motors, a robotic arm, a selectively moveable platform, a gantry, and the like. In one or more examples, the tool-positioning device 126 is electronically operated and/or controlled in any suitable manner, such as via receipt of a control signal from the controller 206.

Generally, the layup tool 118 and, thus, the layup surface 122 are substantially fixed in space relative to the support surface 104 and/or the compaction device 124 when the composite charge 116 is compacted onto the layup surface 122. However, the layup tool 118 and, thus, the layup surface 122 are movable relative to the support surface 104 and/or the compaction device 124 when the composite charge 116 is being separated from the composite sheet 106, when the layup surface 122 is receiving the composite charge 116 and/or immediately before the composite charge 116 is compacted onto the layup surface 122. Selective movement of the layup tool 118 and, thus, the layup surface 122 ensures that the composite charge 116 is properly placed on the layup surface 122 and that the compaction force 128, applied to the composite charge 116 by the compaction device 124, is normal to the layup surface 122.

In one or more examples, the layup tool 118 and, thus, the layup surface 122 move rotationally relative to the support surface 104 (e.g., about a Y-axis) using the tool-positioning device 126 (e.g., as illustrated by directional arrow 228 in FIGS. 2 and 4-7). Selective rotational movement of the layup tool 118 and/or the layup surface 122 properly angularly orients the layup surface 122 to receive the composite charge 116 and to compact the composite charge 116 on the layup surface 122. Selective rotational movement of the layup surface 122 ensures that the compaction force 128 is normal to a portion of the layup surface 122 onto which the composite charge 116 is being compacted.

In one or more examples, the layup tool 118 and, thus, the layup surface 122 move linearly (e.g., translate) in a direction approximately parallel to the support surface 104 (e.g., horizontally along an X-axis) using the tool-positioning device 126 (e.g., as illustrated by directional arrow 230 in FIGS. 2 and 4-7). Selective linear movement of the layup tool 118 and/or the layup surface 122 properly locates the layup surface 122 to receive the composite charge 116 and compact the composite charge 116 on the layup surface 122. The composite charge 116 is substantially non-stretchable. Therefore, a linear displacement of the layup surface 122 relative to the compaction device 124 due to the rotational movement of the layup surface 122 must be considered.

Selective linear movement of the layup surface 122 accounts for the linear displacement of the layup surface 122 relative to the compaction device 124 due to the rotational movement of the layup surface 122 and ensures that a path length of the layup surface 122 that the composite charge 116 is laid up on is 1:1 with a length of the composite charge 116. Additionally, selective linear movement of the layup tool 118 and/or the layup surface 122 enables the composite charge 116 to be placed at a desired longitudinal location (e.g., along the X-axis) on the layup surface 122. For example, selective linear movement of the layup tool 118 and/or the layup surface 122 enables a starting location of the composite charge 116 being placed on the layup surface 122 to be selectively located, such as offset relative to an edge 260 of the layup tool 118 and/or relative to previously placed composite charge 116.

In one or more examples, the layup tool 118 and, thus, the layup surface 122 move linearly (e.g., translate) in a direction that is approximately perpendicular to the support surface 104 (e.g., horizontally along a Y-axis) using the tool-positioning device 126. Selective linear movement of the layup tool 118 and/or the layup surface 122 enables the composite charge 116 to be placed at a desired lateral location (e.g., along the Y-axis) on the layup surface 122.

In one or more examples, the layup tool 118 and, thus, the layup surface 122 move linearly (e.g., translate) in a direction that is approximately perpendicular to the support surface 104 (e.g., vertically along a Z-axis) using the tool-positioning device 126. Selective linear movement of the layup tool 118 and/or the layup surface 122 properly locates the layup surface 122 to receive subsequent ones of the plurality of composite charges 116 and compact each one of the plurality of composite charges 116 to form the stack 216 (e.g., as shown in FIGS. 12-14).

In one or more examples, the system 100, such as the controller 206 or the tool-positioning device 126, includes a motion-control device 158. In one or more examples, the motion-control device 158 is configured to selectively control the tool-positioning device 126. Selective control of the tool-positioning device 126 adjusts the position of the layup tool 118 relative to the compaction device 124 as the compaction device 124 compacts the composite charge 116 on the layup surface 122 such that the compaction force 128, applied to the composite charge 116 by the compaction device 124, is normal to the layup surface 122. The motion-control device 158 includes any suitable structure that is adapted, configured, and/or programmed to automatically control the operation of the tool-positioning device 126. In one or more examples, the motion-control device 158 includes at least one controller, control unit, processor unit, and the like that is adapted or programmed to automatically control operation of tool-positioning device 126. In one or more examples, the motion-control device 158 is an example of the controller 206 or is an example of one of a plurality of control units of the controller 206.

Referring now to FIGS. 2 and 4-7, in one or more examples, the tool-positioning device 126 includes a first actuator 130 and a second actuator 134. The first actuator 130 is coupled to the layup tool 118 at a first location 132 of the layup tool 118. The second actuator 134 is coupled to the layup tool 118 at a second location 136 of the layup tool 118. The second location 136 is spaced away from the first location 132 along the longitudinal tool-axis 120 of the layup tool 118. Coordinated motion of the first actuator 130 and the second actuator 134 rotates the layup tool 118 to selectively adjust the angular orientation of the layup surface 122 and translates the layup tool 118 to selectively adjust the location of the layup surface 122 relative to the compaction device 124. The first actuator 130 and a second actuator 134 includes any suitable structure or mechanism that is capable of selectively moving and/or controlling the position of the layup tool 118. For example, the first actuator 130 and the second actuator 134 may include one or more mechanical actuators, one or more hydraulic actuators, and/or one or more pneumatic actuators. In one or more examples, the first actuator 130 and a second actuator 134 is electronically operated and/or controlled in any suitable manner, such as via receipt of a control signal from the controller 206.

In one or more examples, the motion-control device 158 is configured to selectively control coordinated motion of the first actuator 130 and the second actuator 134 to selectively adjust the angular orientation of (e.g., to rotate) the layup tool 118 relative to the compaction device 124. In one or more examples, the motion-control device 158 is configured to selectively control coordinated motion of the first actuator 130 and the second actuator 134 to selectively adjust the location of (e.g., to translate) the layup tool 118 relative to the compaction device 124.

Figure 5:
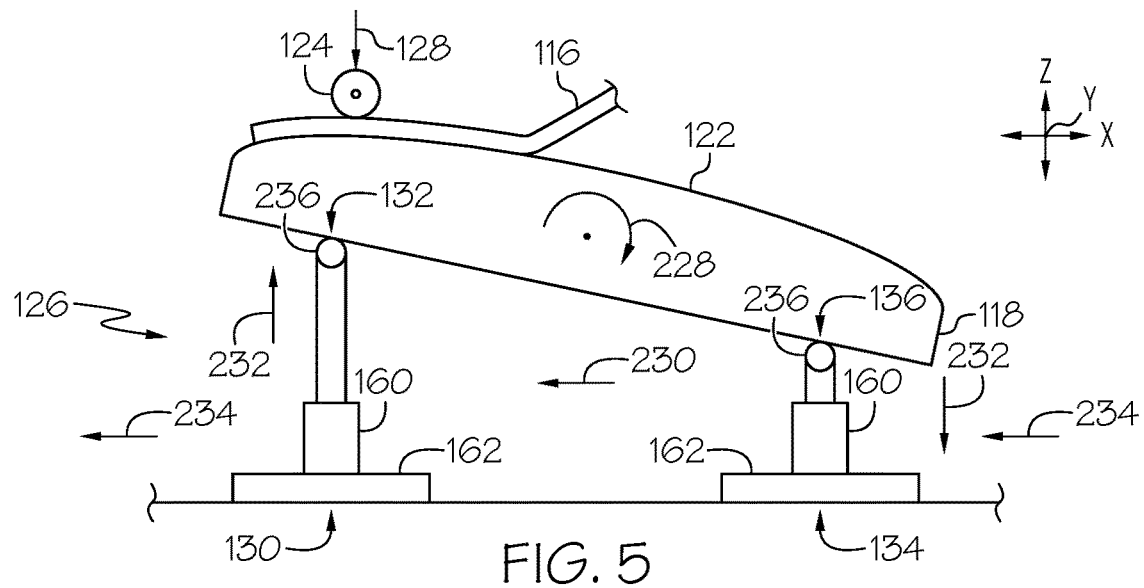
FIG. 5 is a schematic side view of an example of a layup tool and a tool-positioning device of the system.
Figure 6:
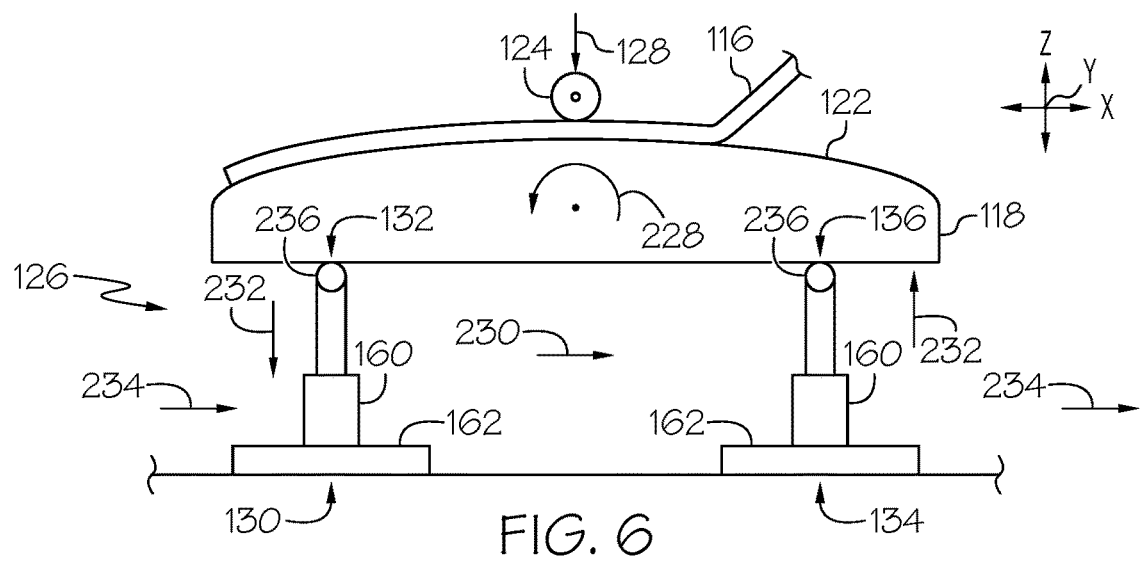
FIG. 6 is a schematic side view of an example of a layup tool and a tool-positioning device of the system.
Figure 7:
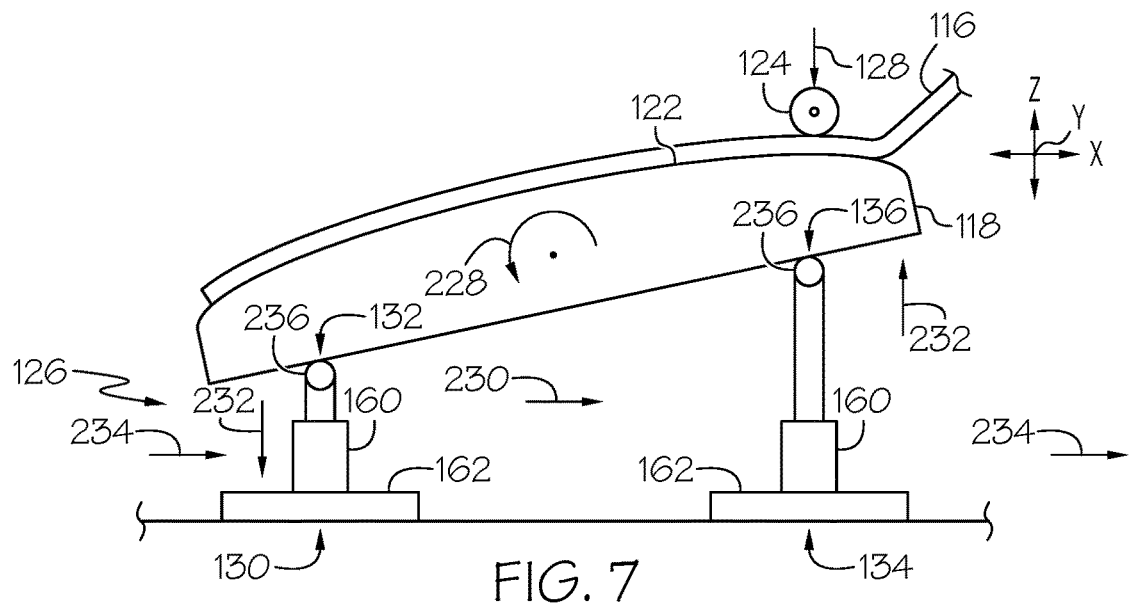
FIG. 7 is a schematic side view of an example of a layup tool and a tool-positioning device of the system.

Referring now to FIGS. 5-7, which, collectively, schematically illustrate different positions of the layup tool 118 and the layup surface 122 as the composite charge 116 is being separated and placed and compacted on the layup surface 122. The separation device 114 is not shown in FIGS. 5-7 for the purpose of clarity of illustration. In one or more examples, each one of the first actuator 130 and the second actuator 134 includes a first linear actuator 160 and a second linear actuator 162. The first linear actuator 160 is configured to linearly move the layup tool 118 in a direction approximately perpendicular to the support surface 104 (e.g., along the Z-axis as illustrated by directional arrows 232). For example, the first linear actuator 160 is configured to selectively adjust a vertical location of the layup tool 118. The second linear actuator 162 is configured to linearly move the layup tool 118 in a direction approximately parallel to the support surface 104 (e.g., along the X-axis as illustrated by directional arrows 234). Additionally, in one or more examples, the second linear actuator 162 is configured to linearly move the layup tool 118 in a direction approximately perpendicular to the support surface 104 (e.g., along the Y-axis). For example, the second linear actuator 162 is configured to selectively adjust a horizontal location of the layup tool 118.

Coordinated movement of the first actuator 130 and the second actuator 134 (e.g., extension and retraction of the first linear actuator 160 as illustrated by directional arrows 232) rotates the layup tool 118 (e.g., as illustrated by directional arrow 228) to selectively angularly orient the layup surface 122 for placement of the composite charge 116 and compaction of the composite charge 116 by the compaction device 124. Coordinated movement of the first actuator 130 and the second actuator 134 (e.g., extension and retraction of the second linear actuator 162 as illustrated by directional arrows 234) translates the layup tool 118 (e.g., as illustrated by directional arrow 230) to selectively locate the layup surface 122 for placement of the composite charge 116 and compaction of the composite charge 116 by the compaction device 124.

In one or more examples, the layup tool 118 is removable from the tool-positioning device 126. For example, the layup tool 118 is removable from the first actuator 130 and the second actuator 134. Removal of the layup tool 118 from the tool-positioning device 126 facilitates replacement of the layup tool, such as with a different layup tool 118 having a different configuration and/or geometry (e.g., a layup surface 122 having a different curvature) and/or the use of a plurality of layup tools 118, for example, as described in more detail herein and illustrated in FIG. 15.

In one or more examples, the layup tool 118 is coupled to each one of the first actuator 130 and the second actuator 134 by a joint connector 236. The joint connector 236 is configured to releasably couple the layup tool 118 to a respective one of the first actuator 130 and the second actuator 134. The joint connector 236 is also configured to enable the layup tool 118 to pivot about a respective one of the first actuator 130 and the second actuator 134 during coordinated motion of the first actuator 130 and the second actuator 134 to selectively position the layup surface 122.

While the illustrative examples of tool-positioning device 126 depict each one of the first actuator 130 and the second actuator 134 as including a dedicated second linear actuator 162, in other examples of tool-positioning device 126, the first actuator 130 and the second actuator 134 include (e.g., share) a common second linear actuator 162. As such, the particular configuration of the first actuator 130 and the second actuator 134, such as illustrated in FIGS. 5-7, is not meant to imply structural limitations with respect to the illustrative example and other configurations of the first actuator 130 and the second actuator 134 are also contemplated.

In one or more examples, the system 100 includes a conveyance device 138. The conveyance device 138 is configured to move the separation device 114 along the support surface 104. In one or more examples, the conveyance device 138 is coupled to the separation device 114 and is configured to translate the separation device 114 along the support surface 104, such as along the support-surface edge 156 (e.g., along the X-axis as illustrated by directional arrow 242 in FIGS. 2, 4, 9 and 10). Translation of the separation device 114 along the support surface 104 using the conveyance device 138 enables the separation device 114 to cut, slit, or otherwise separate the composite sheet 106 to form the composite charge 116.

In one or more examples, the conveyance device 138 is configured to move the compaction device 124 along the support surface 104. In one or more examples, the conveyance device 138 is coupled to the compaction device 124 and is configured to translate the compaction device 124 along the layup surface 122 of the layup tool 118 (e.g., along the X-axis as illustrated by directional arrow 242 in FIGS. 2 and 4). Translation of the compaction device 124 along the layup surface 122 using the conveyance device 138 enables the compaction device 124 to compact the composite charge 116 on the layup surface 122 after the separation device 114 separates the composite sheet 106 to form the composite charge 116.

The conveyance device 138 includes any suitable structure or mechanism that is configured and/or constructed to operatively translate the separation device 114, the compaction device 124, and other components of the system 100, as will be described in more detail herein, relative to the support surface 104 and/or along support-surface edge 156. Examples of the conveyance device 138 include, but are not limited to, a linear actuator, a linear motor, a servomotor, a robotic arm, a rack-and-pinion assembly, a lead screw and nut assembly, a ball screw and nut assembly, and the like. In one or more examples, the conveyance device 138 is electronically controlled in any suitable manner, such as via receipt of a control signal from the controller 206.

In one or more examples, the conveyance device 138 is configured to vary a linear velocity at which the separation device 114 and/or the compaction device 124 move along the support surface 104. In one or more examples, variation in the linear velocity is based, at least in part, on a rotational velocity at which the layup tool 118 rotates in response to movement by the tool-positioning device 126, such as coordinated motion of the first actuator 130 and the second actuator 134. In one or more examples, variation in linear velocity is based, at least in part, on a linear velocity at which the layup tool 118 translates in response to movement by the tool-positioning device 126, such as the coordinated motion of the first actuator 130 and the second actuator 134.

Alternatively, in one or more examples, the tool-positioning device 126 is configured to vary the rotational velocity at which the layup tool 118 rotates and/or the linear velocity at which the layup tool 118 translates. For example, variations in the rotational and/or linear velocities of the layup tool 118 are based, at least in part, on the linear velocity at which the separation device 114 and/or the compaction device 124 move via the conveyance device 138.

In one or more examples, the system 100, such as the controller 206, includes a feedback mechanism 214. In one or more examples, the feedback mechanism 214 is configured to selectively vary the linear velocity at which the separation device 114 and/or the compaction device 124. In one or more examples, the feedback mechanism 214 is configured to selectively vary the rotational and/or linear velocities of the layup tool 118. In one or more examples, the feedback mechanism 214 is configured to coordinate the linear velocity at which the separation device 114 and/or the compaction device 124 and the rotational and/or linear velocities of the layup tool 118.

Figure 8:
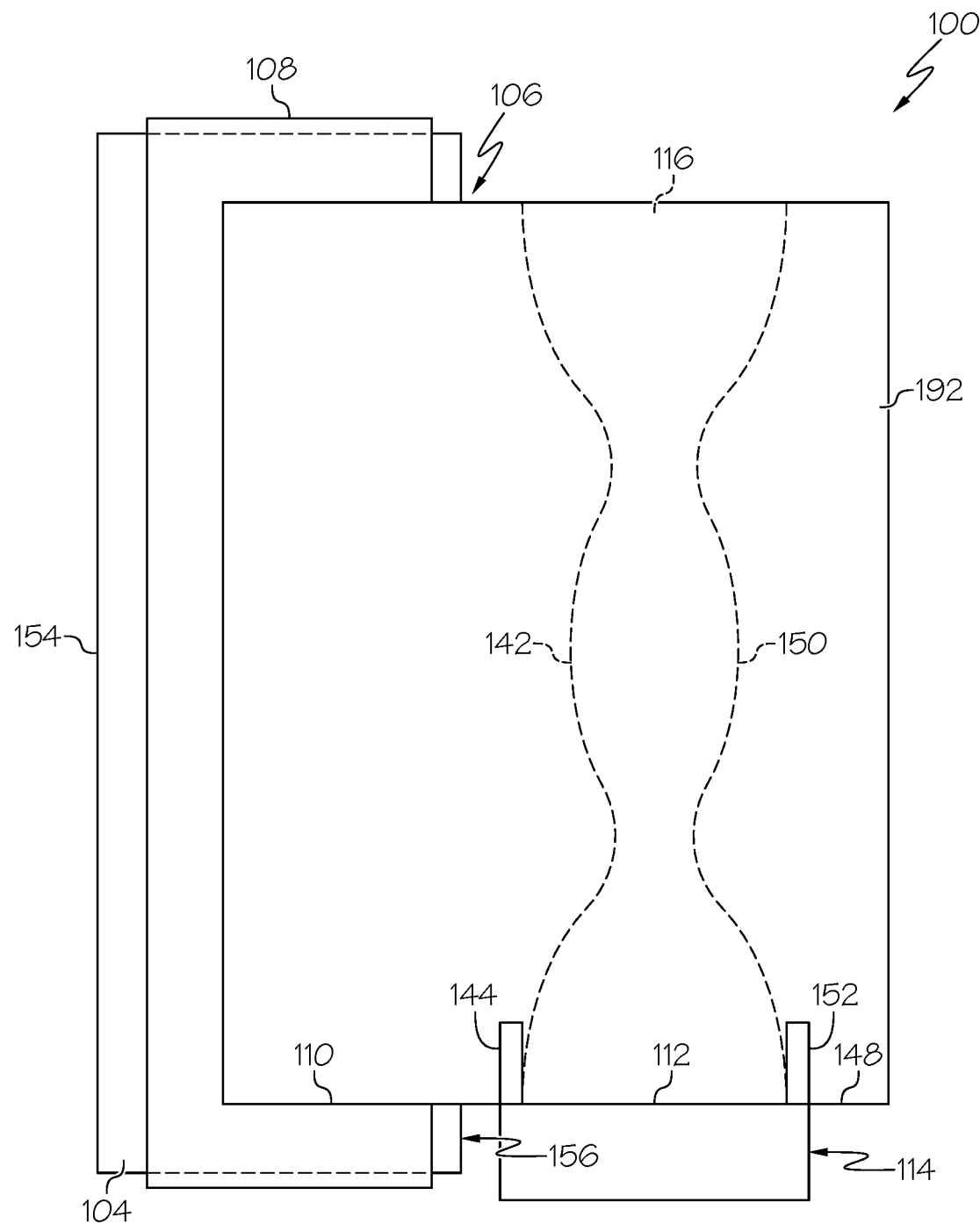
FIG. 8 is a schematic top view of an example of the system.
Figure 9:
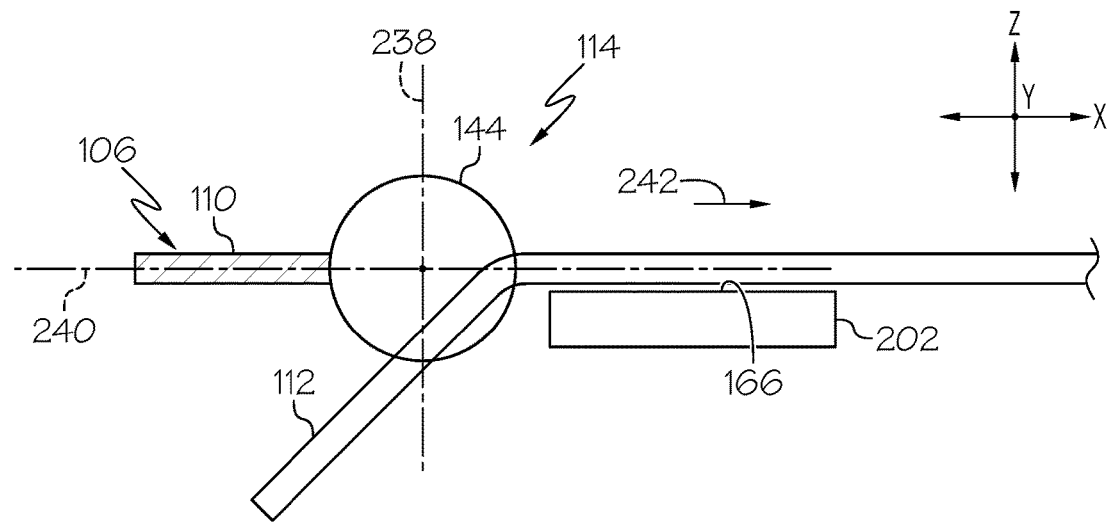
FIG. 9 is a schematic side view of an example of a portion of the system.
Figure 10:
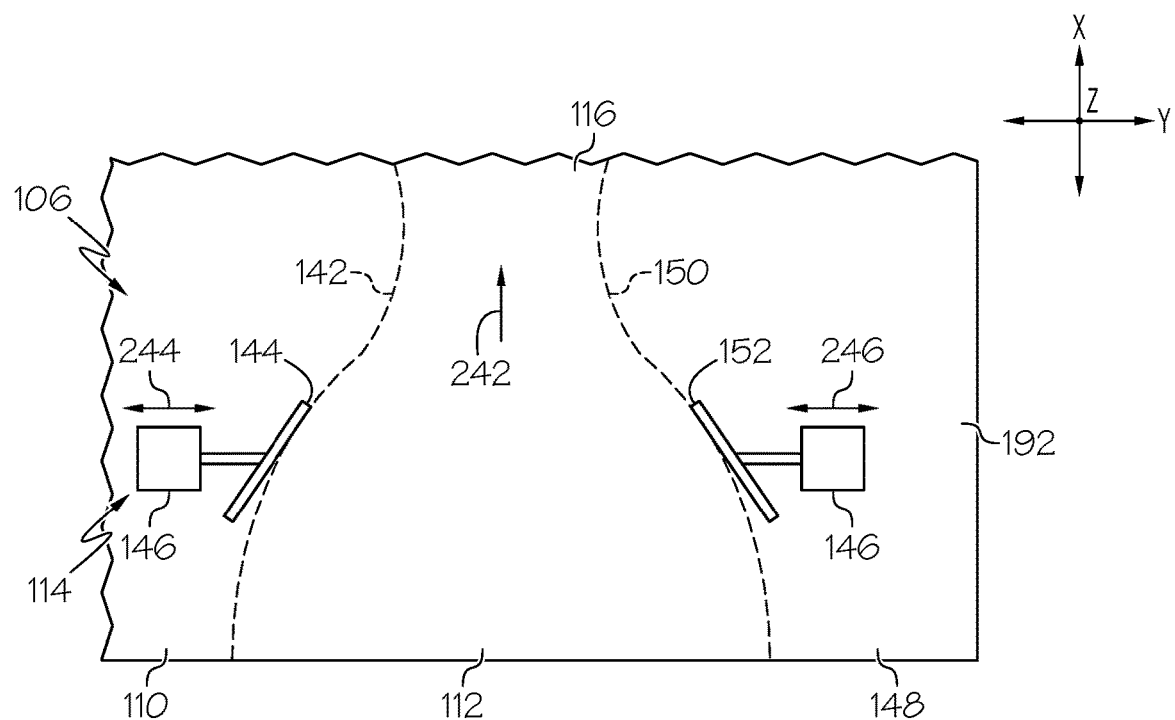
FIG. 10 is a schematic top view of an example of a portion of the system.

Referring now to FIGS. 8-10, in one or more examples, the separation device 114 is configured to separate the second sheet-portion 112 from the first sheet-portion 110 along a separation line 142 (e.g., as shown in FIGS. 8 and 10). Separation of the composite sheet 106 along the separation line 142 forms one (e.g., a first) edge 252, or one (e.g., a first) side 256, of the composite charge 116 (e.g., as shown in FIGS. 12 and 14). In one or more examples, an opposed (e.g., a second) edge 254, or opposed (e.g., a second) side 258, of the composite charge 116 (e.g., as shown in FIGS. 12 and 14) is formed by separating a fraction of the composite material from the second sheet-portion 112, referred to herein as the third sheet-portion 148 using the separation device 114.

In one or more examples, the separation device 114 is configured to separate the third sheet-portion 148 of the composite sheet 106 from the second sheet-portion 112 to form the composite charge 116. Separation of the second sheet-portion 112 from the first sheet-portion 110 creates a strip of composite material (e.g., a strip from the composite sheet 106). Separation of the third sheet-portion 148 from the second sheet-portion 112 removes a fraction from the strip of composite material and creates a first strip of composite material (e.g., a first fraction of the strip) and a second strip of composite material (e.g., a second fraction of the strip). The first strip of composite material forms the composite charge 116 utilized to form at least a portion of the composite stiffener 102. The second strip of composite material forms scrap 192 (e.g., as shown in FIGS. 4, 8 and 10) that can be discarded or recycled.

The separation device 114 includes, or takes the form of, any suitable structure or mechanism that is configured to cut, sever, slit, divide, or otherwise separate the third sheet-portion 148 from the second sheet-portion 112. The separation device 114 is configured and/or located such that a separating (e.g., cutting) action extends entirely through the composite sheet 106 (e.g., through a thickness of the composite sheet 106) when the separation device 114 is separating the third sheet-portion 148 from the second sheet-portion 112.

The separation device 114 is further configured to separate the third sheet-portion 148 from the second sheet-portion 112 along a second separation line 150 (e.g., as illustrated in FIGS. 8 and 10). Separation of the composite sheet 106 along the second separation line 150 forms one (e.g., the second) edge 254, or one (e.g., the second) side 258, of the composite charge 116.

In one or more examples, the separation line 142 is continuous and nonlinear. In one or more examples, the second separation line 150 is continuous and nonlinear. In one or more examples, each of the separation line 142 and the second separation line 150 is continuous and nonlinear. Separation of the second sheet-portion 112 from the first sheet-portion 110 along the separation line 142 that is continuous and nonlinear forms the first edge 252 (e.g., as shown in FIG. 14), or first side 256 (e.g., as shown in FIG. 12), of the composite charge 116 that is nonlinear or that includes the profile shape 212 (e.g., as shown in FIG. 14) that has at least one curved or contoured portion. Separation of the third sheet-portion 148 from the second sheet-portion 112 along the second separation line 150 that is continuous and nonlinear forms the second edge 254 (e.g., as shown in FIG. 14), or second side 258 (e.g., as shown in FIG. 12), of the composite charge 116 that is nonlinear or that includes the profile shape 212 (e.g., as shown in FIG. 14) that has at least one curved or contoured portion.

In one or more examples, the separation device 114 includes a cutter 144. The cutter 144 is configured to cut the composite sheet 106. In one or more examples, separating the third sheet-portion 148 from the second sheet-portion 112 along the second separation line 150 and separating the second sheet-portion 112 from the first sheet-portion 110 are performed sequentially by utilizing two separate passes of the separation device 114 (e.g., two separate cutting operations of the cutter 144) to form both edges 252, 254, or both sides 256, 258, of the composite charge 116.

In one or more examples, the separation device 114 includes the cutter 144 and a second cutter 152 configured to cut the composite sheet 106. In these examples, the cutter 144 may be referred to as a first cutter. In one or more examples, separating the third sheet-portion 148 from the second sheet-portion 112 along the second separation line 150 and separating the second sheet-portion 112 from the first sheet-portion 110 along the separation line 142 are performed substantially concurrently by utilizing a single pass of the separation device 114 (e.g., a single cutting operation of the cutter 144 and the second cutter 152) to form both edges 252, 254, or both sides 256, 258, of the composite charge 116.

The cutter 144 and the second cutter 152 are spaced-apart from each other. The spaced apart relationship (e.g., distance) between the cutter 144 and the second cutter 152 form the width of the composite charge 116.

In one or more examples, the cutter 144 and the second cutter 152 (when present) includes, or takes the form of, any cutting device that is configured to cut, sever, slit, divide, or otherwise separate the composite sheet 106. Examples of the cutter 144 and the second cutter 152 (when present) include, but are not limited to, a knife, an ultrasonic knife, a laser knife, a blade, a shear, a circular blade and cylindrical anvil, and the like.

The cutter 144 and the second cutter 152 (e.g., when present) are configured and/or located such that the cutting action extends entirely through the composite sheet 106 (e.g., through the thickness of the composite sheet 106) when the cutter 144 is separating the second sheet-portion 112 from the first sheet-portion 110 and when the second cutter 152 is separating the third sheet-portion 148 from the second sheet-portion 112 (e.g., when performed). As an example, the cutter 144 and the second cutter 152 (e.g., when present) are located above the composite sheet 106 and extend through the composite sheet 106 from above. As another example, the cutter 144 and the second cutter 152 (e.g., when present) are located below the composite sheet 106 and extend through the composite sheet 106 from below. As yet another example, the cutter 144 and the second cutter 152 (e.g., when present) are located above and below the composite sheet 106 and extend through the composite sheet 106 from above and below.

Referring now to FIGS. 9 and 10, in one or more examples, the separation device 114 includes a cutter-positioning device 146 (e.g., as shown in FIG. 10). In one or more examples, the cutter-positioning device 146 is configured to selectively adjust (e.g., rotate) a cutting angle of the cutter 144 relative to the composite sheet 106. For example, the cutter-positioning device 146 is configured to selectively angularly orient the cutting angle of the cutter 144 about at least one cutter axis when the cutter 144 is moved along the separation line 142, for example, using the conveyance device 138 (e.g., as illustrated by directional arrow 242).

In one or more examples, the cutter-positioning device 146 is configured to selectively rotate the cutting angle of the cutter 144 about a first cutter axis 238 (e.g., about the Z-axis). Selective rotation of the cutting angle of the cutter 144 about the first cutter axis 238 forms the profile shape 212 of one (e.g., the first) edge 252 of the composite charge 116 (e.g., in top plan view as shown in FIG. 14). As an example, selective rotation of the cutting angle of the cutter 144 about the first cutter axis 238 accounts for nonlinear variations in the separation line 142 and forms one (e.g., the first) edge 252 of the composite charge 116 that is nonlinear or that includes the profile shape 212 (e.g., as shown in FIG. 14) that has at least one curved or contoured portion.

In one or more examples, the cutter-positioning device 146 is configured to selectively rotate the cutting angle of the cutter 144 about a second cutter axis 240 (e.g., about the X-axis). Selective rotation of the cutting angle of the cutter 144 about the second cutter axis 240 forms a profile shape of one (e.g., the first) side 256 of the composite charge 116 (e.g., in end view as shown in FIG. 12). As an example, rotation of the cutting angle of the cutter 144 about the second cutter axis 240 (e.g., to an approximately vertical orientation parallel to the Z-axis) enables the side 256 of the composite charge 116 to be approximately perpendicular to a major surface of the composite charge 116. For example, the side 256 of the composite charge 116 is approximately vertical or approximately parallel to the Z-axis such that the trapezoidal shape of the composite structure 102 has a stepped sidewall. As another example, rotation of the cutting angle of the cutter 144 about the second cutter axis 240 (e.g., to an orientation oblique to the Z-axis) enables the side 256 of the composite charge 116 to be oblique to the major surface of the composite charge 116, such as to form a bevel (e.g., as shown in FIG. 12). For example, the side 256 of the composite charge is oblique to the Z-axis such that the trapezoidal shape of the composite structure 102 has an inwardly tapered sidewall.

In one or more examples, the cutter-positioning device 146 is configured to selectively locate (e.g., linearly move) the cutter 144 relative to the composite sheet 106. Selective location of the cutter 144 relative to the composite sheet 106 accounts for nonlinear variations in the separation line 142 and forms variations in the width of the composite charge 116. This may include operative translation of the cutter 144 (e.g., along the Y-axis) relative to the composite sheet 106 (e.g., as illustrated by directional arrow 244 in FIG. 10).

In one or more examples, the cutter-positioning device 146 is configured to selectively adjust (e.g., rotate) the cutting angle (e.g., a second cutting angle) of the second cutter 152 (e.g., when present). For example, the cutter-positioning device 146 is configured to selectively angularly orient the cutting angle of the second cutter 152 about at least one cutter axis when the second cutter 152 is moved along the second separation line 150, for example, using the conveyance device 138 (e.g., as illustrated by directional arrow 242). While not explicitly illustrated, the second cutter 152 (e.g., as shown in FIGS. 3, 4, 8 and 10) has a first cutter axis and a second cutter axis that are substantially the same of the first cutter axis 238 and the second cutter axis 240 illustrated in FIG. 9 with respect to the cutter 144.

In one or more examples, the cutter-positioning device 146 is configured to selectively rotate the cutting angle of the second cutter 152 about the first cutter axis (e.g., about the Z-axis). Selective rotation of the cutting angle of the second cutter 152 about the first cutter axis forms the profile shape 212 of one (e.g., the second) edge 254 of the composite charge 116 (e.g., in top plan view as shown in FIG. 14). As an example, selective rotation of the cutting angle of the second cutter 152 about the first cutter axis accounts for nonlinear variations in the second separation line 150 and forms one (e.g., the second) edge 254 of the composite charge 116 that is nonlinear or that includes the profile shape 212 (e.g., as shown in FIG. 14) that has at least one curved or contoured portion.

In one or more examples, the cutter-positioning device 146 is configured to selectively rotate the cutting angle of the second cutter 152 about the second cutter axis (e.g., about the X-axis). Selective rotation of the cutting angle of the second cutter 152 about the second cutter axis forms a profile shape of one (e.g., the second) side 258 of the composite charge 116 (e.g., in end view as shown in FIG. 12). As an example, rotation of the cutting angle of the second cutter 152 about the second cutter axis (e.g., to an approximately vertical orientation parallel to the Z-axis) enables the side 258 of the composite charge 116 to be approximately perpendicular to the major surface of the composite charge 116. For example, the side 258 of the composite charge 116 is approximately vertical or approximately parallel to the Z-axis such that the trapezoidal shape of the composite structure 102 has a stepped sidewall. As another example, rotation of the cutting angle of the second cutter 152 about the second cutter axis (e.g., to an orientation oblique to the Z-axis) enables the side 258 of the composite charge 116 to be oblique to the major surface of the composite charge 116, such as to form a bevel (e.g., as shown in FIG. 12). For example, the side 258 of the composite charge is oblique to the Z-axis such that the trapezoidal shape of the composite structure 102 has an inwardly tapered sidewall.

In one or more examples, the cutter-positioning device 146 is configured to selectively locate (e.g., linearly move) the second cutter 152 relative to the composite sheet 106. Selective location of the second cutter 152 relative to the composite sheet 106 accounts for nonlinear variations in the second separation line 150 and forms variations in the width of the composite charge 116. This may include operative translation of the second cutter 152 (e.g., along the Y-axis) relative to the composite sheet 106 (e.g., as illustrated by directional arrow 246 in FIG. 10).

In one or more examples, the cutter-positioning device 146 is further configured to selectively locate the cutter 144 and the second cutter 152 relative to the composite sheet 106 and/or relative to each other. Selective location of the cutter 144 and second cutter 152 relative to each other accounts for nonlinear variations in the separation line 142 and the second separation line 150 and forms and/or controls variations in the width profile of the composite charge 116. Accordingly, the cutter-positioning device 146 may serve as a charge width-adjusting device that is configured to selectively adjust the width and/or the width profile of the composite charge 116 during formation. In one or more examples, the width of at least one of the composite charges 116 is different than the width of at least another one of the composite charges 116. For example, the width of the plurality of composite charges 116 may progressively decrease from a bottom of the stack 216 to a top of the stack 216 (e.g., as shown in FIGS. 12 and 14).

The cutter-positioning device 146 includes any suitable structure or mechanism that is capable of being utilized to selectively locate (e.g., operatively translate) the cutter 144 and the second cutter 152 (e.g., when present) relative to the composite sheet 106 during separation of the composite charge 116 from the composite sheet 106. Examples, of the cutter-positioning device 146 includes, but are not limited to, one or more linear actuators, one or more rotary actuators, servomotors, a selectively moveable platform, and the like. In one or more examples, the cutter-positioning device 146 is electronically operated and/or controlled in any suitable manner, such as via receipt of a control signal from the controller 206.

In one or more examples, the separation device 114 includes a single cutter-positioning device 146 that is configured to selectively locate and angularly orient the cutter 144 and the second cutter 152, for example, the cutter 144 and the second cutter 152 share a common cutter-positioning device 146. In one or more examples, the separation device 114 includes a plurality of (e.g., two) cutter-positioning devices 146 in which each one of the cutter 144 and the second cutter 152 has a dedicated cutter-positioning device 146.

In one or more examples, the separation device 114 includes at least one cutter drive (not explicitly illustrated) associated with the cutter 144 and the second cutter 152 (e.g., when present). The cutter drive is configured to operate and/or supply power to the cutter 144 and the second cutter 152 (e.g., when present) associated with the cutter drive. The cutter drive includes any suitable mechanism that is configured to energize the cutter 144 and the second cutter 152 (e.g., when present) and depends on the type of cutting mechanism. Examples of the cutter drive include, but are not limited to, a motor, an actuator, a laser source, an ultrasonic energy source, and the like. In one or more examples, the cutter drive is electronically controlled in any suitable manner, such as via receipt of a control signal from the controller 206 (e.g., as shown in FIGS. 1-4).

Referring again to FIGS. 1-4, in one or more examples, the system 100 includes a second support surface 166. In these examples, the support surface 104 may also be referred to as a first support surface. The second support surface 166 is configured to support at least a portion of the second sheet-portion 112 when the second sheet-portion 112 is separated from the first sheet-portion 110 to form the composite charge 116. As best illustrated in FIG. 1, the support surface 104 and the second support surface 166 are spaced apart and form a gap 168 therebetween. In one or more examples, the support surface 104 and the second support surface 166 are substantially coplanar.

In one or more examples, the sheet-locating device 108 is configured to selectively extend the second sheet-portion 112 across the gap 168 and onto the second support surface 166. The second support surface 166 is configured to support at least a portion (e.g., a fraction) of the second sheet-portion 112 when the second sheet-portion 112 extends past the support-surface edge 156 and across the gap 168.

In one or more examples, the second support surface 166 includes, or is formed by, any suitable structure. For example, the system 100 includes a second support structure 202, such as a platform or body, that is located adjacent to the support structure 154 and/or the support surface 104. In one or more examples, the cutter 144 is operatively coupled with the second support structure 202. Thus, the cutter 144 moves (e.g., translates) with the second support structure 202 and/or the second support surface 166, such as utilizing the conveyance device 138.

In one or more examples, the conveyance device 138 is configured to move the second support structure 202 and/or the second support surface 166 along the support surface 104. In one or more examples, the conveyance device 138 is coupled to the second support structure 202 and is configured to translate the second support surface 166 along the support surface 104, such as along the support-surface edge 156. Translation of the second support surface 166 along the support surface 104 using the conveyance device 138 enables the second support surface 166 to support a portion of the composite sheet 106 (e.g., a portion of the second sheet-portion 112) when the separation device 114 separates the composite sheet 106 to form the composite charge 116.

Figure 3:
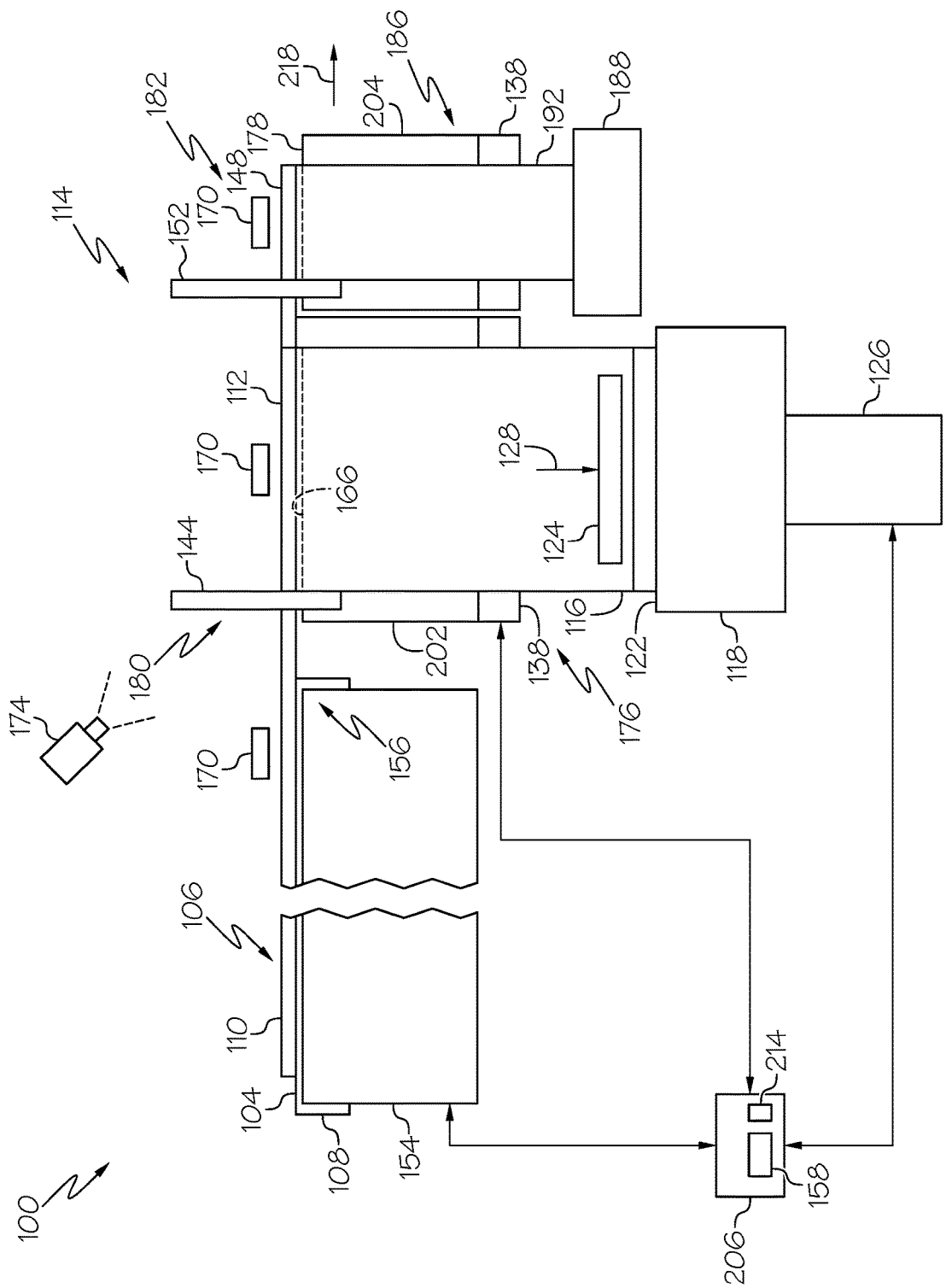
FIG. 3 is a schematic end view of an example of the system.

Referring to FIGS. 3 and 4, in one or more examples, the system 100 includes a third support surface 178. The second support surface 166 is configured to support the second sheet-portion 112 during separation of the second sheet-portion 112 from the first sheet-portion 110 to form the composite charge 116. The third support surface 178 is configured to support the third sheet-portion 148 during separation of the third sheet-portion 148 from the second sheet-portion 112 to form the composite charge 116. The third support surface 178 is spaced apart from the second support surface 166. In one or more examples, the support surface 104, the second support surface 166, and the third support surface 178 are substantially coplanar.

In one or more examples, the sheet-locating device 108 is configured to selectively extend the second sheet-portion 112 onto the second support surface 166 and the third sheet-portion 148 onto the third support surface 178. The second support surface 166 is configured to support at least a portion (e.g., a fraction) of the second sheet-portion 112 when the second sheet-portion 112 extends past the support surface 104. The third support surface 178 is configured to support at least a portion (e.g., a fraction) of the third sheet-portion 148 when the third sheet-portion 148 extends past the second support surface 166.

In one or more examples, the third support surface 178 (when present) includes, or is formed by, any suitable structure. For example, the system 100 includes a third support structure 204, such as a platform or body, that is located adjacent to the second support structure 202 and/or the second support surface 166.

In one or more examples, the conveyance device 138 is configured to move the third support structure 204 and/or the third support surface 178, for example, substantially concurrently with the second support structure 202 and the second support surface 166. In one or more examples, the conveyance device 138 is coupled to the third support structure 204 and is configured to translate the third support surface 178. Translation of the third support surface 178 using the conveyance device 138 enables the third support surface 178 to support a portion of the composite sheet 106 (e.g., a portion of the third sheet-portion 148) when the separation device 114 separates the composite sheet 106 to form the composite charge 116.

During operation of the system 100, the second support surface 166 is located adjacent to the support surface 104. The third support surface 178 is located adjacent to the second support surface 166, opposite to the support surface 104. In other words, a distance between the support surface 104 and the second support surface 166 is less than a distance between the support surface 104 and the third support surface 178.

In one or more examples, the support surface 104, the second support surface 166, and the third support surface 178 (e.g., when present), are at least substantially coplanar with one another. Additionally, in one or more examples, the support surface 104, the second support surface 166, and the third support surface 178 (e.g., when present), are at least substantially parallel to one another. Alternatively, in one or more examples, the second support surface 166 is located (e.g., slightly) vertically below the support surface 104. In one or more examples, the third support surface 178 (e.g., when present) is located (e.g., slightly) vertically below the second support surface 166. Such an arrangement may permit the composite sheet 106 to extend past the support-surface edge 156 and onto the second support surface 166 and/or the third support surface 178 without contacting an edge of the second support structure 202 and/or an edge of the third support structure 204.

Referring to FIGS. 2 and 4, in one or more examples, the system 100 includes a charge-transition device 172. The charge-transition device 172 is configured to direct the composite charge 116 from the second support surface 166 onto the layup surface 122. Alternatively, the charge-transition device 172 is configured to support the composite charge 116 while the composite charge 116 is conveyed from the second support surface 166 onto the layup surface 122. In one or more examples, the charge-transition device 172 includes a charge-transition surface that extends, at least partially, from the second support surface 166 to the layup surface 122. In one or more examples, the charge-transition surface of the charge-transition device 172 extends at an oblique angle relative to second support surface 166 and/or relative to layup surface 122. In one or more examples, the charge-transition device 172 is configured to move (e.g., translate) with the second support surface 166 and/or with the separation device 114 when the second sheet-portion 112 is separated from the first sheet-portion 110. In one or more examples, the charge-transition device 172 is operatively coupled to the second support surface 166 and/or to the separation device 114.

In one or more examples, the conveyance device 138 is configured to move the charge-transition device 172 along the support surface 104. In one or more examples, the conveyance device 138 is coupled to the charge-transition device 172 and is configured to translate the charge-transition device 172 along the support surface 104, such as along the support-surface edge 156. Translation of the charge-transition device 172 along the support surface 104 using the conveyance device 138 enables the charge-transition device 172 to direct the composite charge 116 to the layup surface 122 after the separation device 114 separates the composite sheet 106 to form the composite charge 116.

Referring to FIGS. 3 and 4, in one or more examples, the system 100 includes a scrap bin 188. The scrap bin 188 is configured to receive the third sheet-portion 148 after separation of the third sheet-portion 148 from the second sheet-portion 112. In one or more examples, the scrap bin 188 is spaced apart from the layup tool 118 and is utilized to maintain the third sheet-portion 148 (e.g., scrap 192) separate and distinct from the composite charge 116 and the layup surface 122.

In one or more examples, the system 100 includes a scrap-transition device 190 (e.g., as illustrated in FIG. 4). The scrap-transition device 190 is configured to direct the scrap 192 from the third support surface 178 toward or into the scrap bin 188. In one or more examples, the scrap-transition device 190 includes a scrap-transition surface that extends, at least partially, from the third support surface 178 to the scrap bin 188. In one or more examples, the scrap-transition surface of the scrap-transition device 190 extends at an oblique angle relative to third support surface 178 and/or relative to scrap bin 188. In one or more examples, the scrap-transition device 190 is configured to move (e.g., translate) with the third support surface 178 and/or with the separation device 114 when the third sheet-portion 148 is separated from the second sheet-portion 112.

Figure 11:
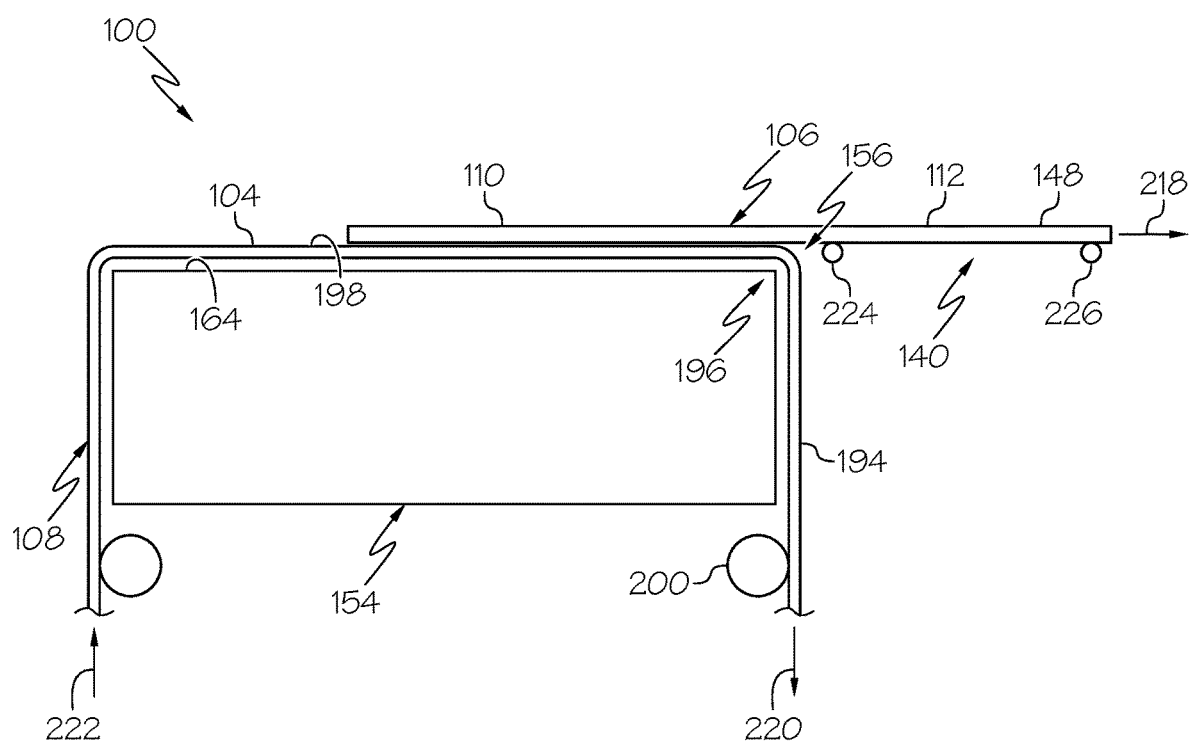
FIG. 11 is a schematic end view of an example of a portion of the system.

Referring now to FIG. 11, which schematically illustrates a portion of the system 100 and, more particularly, an example of the sheet-locating device 108. In one or more examples, the system 100 includes a support structure 154, which may also be referred to as a first support structure. The support structure 154 includes any suitable structure that defines the support surface 104 and/or the support-surface edge 156. As examples, the support structure 154 includes, or takes the form of, a platform, table, bench, or the like that has a generally flat (e.g., planar) top that forms a work surface 164 that is approximately level and a work-surface edge 196.

In one or more examples, the sheet-locating device 108 includes a belt conveyor 194. The belt conveyor 194 covers at least a portion of the work surface 164 of the support structure 154 and extends across the work surface 164 and over or around the work-surface edge 196 of the support structure 154. The belt conveyor 194 includes a belt surface 198. In one or more examples, the belt surface 198 of the belt conveyor 194 directly supports the composite sheet 106 and, thus, the belt surface 198 forms the support surface 104 and the support-surface edge 156. The belt conveyor 194 also may be referred to as a conveyor belt. In one or more examples, the belt conveyor 194 is formed from a material that is approved for contact with the composite sheet 106 and that will not contaminate the composite sheet 106, thereby permitting direct physical contact between the belt conveyor 194 and the composite sheet 106.

In one or more examples, the sheet-locating device 108 includes a belt drive 200. The belt drive 200 is configured to selectively and/or operatively move (e.g., translate) the belt conveyor 194 relative to the work surface 164 of the support structure 154 (e.g., as illustrated by direction arrows 220, 222). Selective translation of the belt conveyor 194 selectively extends the second sheet-portion 112 over and past the support-surface edge 156 (e.g., as indicated by directional arrow 218). The belt drive 200 includes any suitable mechanism that is configured to selectively and/or operatively move the belt conveyor 194, such as a linear or rotary actuator, a drive roller, a servomotor, and the like. In one or more examples, the belt drive 200 is electronically controlled in any suitable manner, such as via receipt of a control signal from a controller 206 (e.g., as shown in FIGS. 1-4).

In one or more examples, the work surface 164 of the support structure 154 directly supports the composite sheet 106 and, thus, the work surface 164 forms the support surface 104 and the work-surface edge 196 forms the support-surface edge 156. In these examples, the sheet-locating device 108 includes any suitable mechanism that is configured to move and/or selectively locate the composite sheet 106 across the work surface 164 of the support structure 154 (e.g., the support surface 104).

In one or more examples, the system 100 includes a sheet-support mechanism 140. In one or more examples, the sheet-support mechanism 140 is configured to support the second sheet-portion 112 that extends beyond the support surface 104 and/or that extends, or is cantilevered, past the support-surface edge 156. In one or more examples, the sheet-support mechanism 140 is configured to support the third sheet-portion 148 that extends beyond the support surface 104 and/or that extends, or is cantilevered, past the support-surface edge 156.

In one or more examples, the sheet-support mechanism 140 includes a first sheet support 224. The first sheet support 224 is located adjacent to the support surface 104, such as adjacent to the support-surface edge 156 and extends approximately parallel to the support-surface edge 156. The first sheet support 224 is configured to support a portion of the second sheet-portion 112 along the length of the composite sheet 106 that is not supported by the second support surface 166 when the second sheet-portion 112 is extended beyond the support surface 104.

In one or more examples, the sheet-support mechanism 140 includes a second sheet support 226. The second sheet support 226 is spaces apart from and extends approximately parallel to the first sheet support 224. The second sheet support 226 is configured to support a portion of the third sheet-portion 148 along the length of the composite sheet 106 that is not supported by the third support surface 178 when the third sheet-portion 148 is extended beyond the second support surface 166.

The first sheet support 224 and the second sheet support 226 include any suitable structure or mechanism that is capable of being used to support a portion (e.g., a cantilevered portion) of the composite sheet 106 before and/or during separation of the composite charge 116 from the composite sheet 106. Examples of the first sheet support 224 and the second sheet support 226 (e.g., when present) include, but are not limited to, a cord, a cable, a rod, a string, and the like.

The sheet-support mechanism 140 is configured and/or located as to not interfere with movement (e.g., translation) of the separation device 114, the second support surface 166, and the third support surface 178 (e.g., when present) during separation of the composite sheet 106 to form the composite charge 116. In one or more examples, as best illustrated in FIGS. 2 and 4), the second support structure 202 includes an opening, a recess, an aperture, or the like that is configured to accommodate the first sheet support 224. In one or more examples, as best illustrated in FIG. 4, the third support structure 204 includes an opening, a recess, an aperture, or the like that is configured to accommodate the second sheet support 226.

Referring again to FIGS. 3 and 4, in one or more examples of the system 100 configured to substantially concurrently separate the second sheet-portion 112 from the first sheet-portion 110 and separate the third sheet-portion 148 from the second sheet-portion 112, the separation device 114 includes a first separation device 180 and a second separation device 182 (e.g., as illustrated in FIG. 3). The first separation device 180 includes the cutter 144 and is associated with the second support surface 166. The second separation device 182 includes the second cutter 152 and is associated with the third support surface 178. In these examples, the conveyance device 138 is configured to move the first separation device 180 and the second separation device 182 along the support surface 104. In one or more examples, compaction device 124 is configured to move (e.g., translate) with first separation device 180 (e.g., the second support surface 166 and the cutter 144) when the second sheet-portion 112 is separated from the first sheet-portion 110.

Referring again to FIGS. 1-4, in one or more examples, the system 100 includes other components configured to control the placement and/or location of the composite charge 116 on the layup surface 122 after the composite charge 116 is separated from the composite sheet 106.

In one or more examples, the system 100 also includes a stabilization device 170. The stabilization device 170 is configured to retain the first sheet-portion 110 at a substantially fixed location relative to the support surface 104 during separation of the second sheet-portion 112 from the first sheet-portion 110. Optionally, the stabilization device 170 is also configured to retain the second sheet-portion 112 at a substantially fixed location relative to the second support surface 166 during separation of the second sheet-portion 112 from the first sheet-portion 110. The stabilization device 170 includes, or takes the form of, any structure or mechanism configured to apply a stabilization force that holds the first sheet-portion 110 against the support surface 104 and/or that holds the second sheet-portion 112 against the second support surface 166. In one or more examples, the stabilization device 170 includes, or takes the form of, at least one stabilizing roller.

In one or more examples, the system 100 includes a detection device 174. The detection device 174 is configured to detect and/or monitor at least one property of the system 100 and/or at least one property of the composite sheet 106, such as during separation of the composite charge 116 from the composite sheet 106. In one or more examples, the detection device 174 includes any suitable detector or sensor that is configured to detect and/or monitor one or more properties of the system 100, the composite sheet 106, the first sheet-portion 110, the second sheet-portion 112, the third sheet-portion 148, and/or the composite charge 116. Examples of the detection device 174 include, but are not limited to, an optical detector, a laser, a light source, a photodetector, a photodetector array, a charge coupled device (CCD), a camera, and the like. In one or more examples, the detection device 174 is coupled to (e.g., is in communicate with) the controller 206 and/or includes an internal logic device that is utilized to quantify one or more properties of composite sheet 106, the composite charge 116, and/or the composite stiffener 102.

In one or more examples, the detection device 174 is configured to detect a location of the composite charge 116 on the layup surface 122. In one or more examples, this detection is performed in real-time and/or concurrently with the composite charge 116 being separated from the composite sheet 106 and being placed on the layup surface 122. In one or more examples, the detection device 174 is configured to generate a location indication signal that is indicative of the location of composite charge 116 on the layup surface 122 and to supply the location indication signal to the controller 206. In one or more examples, the detection device 174 is configured to detect a width of the composite charge 116 on the layup surface 122 and/or to detect, or determine, a cross-sectional area of a stack of composite charges 116 on the layup surface 122.

In one or more examples, the system 100 includes a charge location-adjusting device that is configured to direct or urge the composite charge 116 to a desired location on the layup surface 122. In one or more examples, the charge location-adjusting device is a component of the charge-transition device 172. In one or more examples, the charge location-adjusting device is a guide rail that is configured to passive locate the composite charge 116 on the layup surface 122. In one or more examples, the charge location-adjusting device is a mechanism that is in communication with the controller 206 and that is configured to actively, or dynamically, adjust the location of the composite charge 116 on the layup surface 122.

In one or more examples, the system 100 includes at least one feed roller that is configured to convey the composite charge 116 from the separation device 114 toward the layup surface 122. In one or more examples, the feed roller is a component of the charge-transition device 172. In one or more examples, a single feed roller that rolls the charge-transition surface and presses against a single side of the composite charge 116. In one or more examples, a pair of feed rollers is configured to roll against opposed sides of the composite charge 116. In one or more examples, the feed roller is a motorized roller, such as a servo-controlled roller.

In one or more examples, the cutter 144, the second support surface 166, the second support structure 202, and the charge-transition device 172 are combined (e.g., coupled together) to form a separation assembly 176 (e.g., as shown in FIG. 2). In these examples, the conveyance device 138 is configured to move the separation assembly 176 along the support surface 104. In one or more examples, the conveyance device 138 is coupled to the separation assembly 176. Accordingly, in one or more examples, the conveyance device 138 is utilized to translate the separation assembly 176 along the support surface 104, such as along the support-surface edge 156, thereby separating the second sheet-portion 112 from the first sheet-portion 110 to, at least partially, form the composite charge 116. Concurrently, or immediately thereafter, the composite charge 116 is directed or conveyed onto the layup surface 122 (e.g., using the charge-transition device 172) and compacted on the layup surface 122 using the compaction device 124.

In one or more examples, the cutter 144, the second support surface 166, the second support structure 202, the charge-transition device 172, the second cutter 152, the third support surface 178, the third support structure 204, and the scrap-transition device 190 are combined (e.g., coupled together) to form the separation assembly 176. In these examples, the conveyance device 138 is utilized to translate the separation assembly 176 along the support surface 104, such as along the support-surface edge 156, thereby separating the second sheet-portion 112 from the first sheet-portion 110 and separating the third sheet-portion 148 from the second sheet-portion 112 to (e.g., fully) form the composite charge 116. Concurrently, or immediately thereafter, the composite charge 116 is directed or conveyed onto the layup surface 122 (e.g., using the charge-transition device 172) and compacted on the layup surface 122 using the compaction device 124.

In one or more examples, the second cutter 152, the third support surface 178, the third support structure 204, and the scrap-transition device 190 are combined (e.g., coupled together) to form a second separation assembly 186 (e.g., as shown in FIG. 4). In these examples, the separation assembly 176, including the cutter 144, the second support surface 166, the second support structure 202, and the charge-transition device 172, may be referred to as a first separation assembly. In these examples, the conveyance device 138 is configured to move the separation assembly 176 and the second separation assembly 186 along the support surface 104. In one or more examples, the conveyance device 138 is coupled to the separation assembly 176 and to the second separation assembly 186. Alternatively, the system 100 includes a second conveyance device (not explicitly illustrated) that is coupled to and is configured to move the second separation assembly 186 independent from the separation assembly 176. As such, in one or more examples, the system 100 is configured to form the composite charge 116 and the scrap 192 non-concurrently. Accordingly, in one or more examples, the conveyance device 138 is utilized to translate the separation assembly 176 and the second separation assembly 186 along the support surface 104, such as along the support-surface edge 156, thereby separating the second sheet-portion 112 from the first sheet-portion 110 and separating the third sheet-portion 148 from the second sheet-portion 112 to (e.g., fully) form the composite charge 116. Concurrently, or immediately thereafter, the composite charge 116 is directed or conveyed onto the layup surface 122 (e.g., using the charge-transition device 172) and compacted on the layup surface 122 using the compaction device 124.

In one or more examples, the conveyance device 138 is configured to control the location and movement of the separation assembly 176 and the second separation assembly 186 relative to each other and/or relative to the support surface 104. For example, the conveyance device 138 serves as a charge width-adjusting device that is configured to adjust the width of the composite charge 116 during formation by selectively controlling the relative locations of the separation assembly 176 and the second separation assembly 186. This may include adjusting and/or varying the width of the composite charge 116 along the length of composite charge 116 during, or concurrently with, separation of composite charge 116 from the composite sheet 106 without changing a distance that second sheet-portion 112 extends past support-surface edge 156.

Alternatively, in one or more examples, the system 100 includes a dedicated charge width-adjusting device that is configured to adjust the width of the composite charge 116 during formation. As an example, the charge width-adjusting device is configured to translate the separation assembly 176 and/or the second separation assembly 186 relative to support surface 104 independent translation of the separation assembly 176 and/or the second separation assembly 186 along the support-surface edge 156 using the conveyance device 138. For example, the charge width-adjusting device is configured to translate the separation assembly 176 and/or the second separation assembly 186 in the direction that is approximately perpendicular to the support-surface edge 156 (e.g., along the Y-axis). In these examples, the charge width-adjusting device is electronically controlled in any suitable manner. For example, the controller 206 may send a control signal to charge width-adjusting device to control the operation thereof.

In one or more examples, the compaction force 128 applied to the composite charge 116 by the compaction device 124 is actively controlled. As an example, the compaction force 128 is actively controlled by adjusting a height (e.g., the vertical location) of the layup surface 122 relative to the second support surface 166 and/or the compaction device 124, such as with the tool-positioning device 126. As another example, the compaction force 128 is actively controlled by adjusting a height (e.g., the vertical location) of the compaction device 124 relative to the layup surface 122, such as with a height adjustment mechanism. This may include adjusting to maintain a constant, or at least substantially constant, distance between a top surface of a partially completed composite charge 116, which is positioned on the layup surface 122, and the compaction device 124 and/or the second support surface.

The support surface 104, the second support surface 166, the layup surface 122, the transition surface of the charge-transition device 172, the contact surface of the compaction device 124, the contact surface of the stabilization device 170, the third support surface 178 (e.g., when present) and/or any other structures and/or surfaces that contact the composite sheet 106 and/or the composite charge 116 may be formed from any suitable material. As an example, any structures and/or surfaces that contact the composite sheet 106 and/or the composite charge 116 are formed of a material that is approved for contact with a composite material, such as a material that will not damage the composite sheet 106 and/or the composite charge 116 and/or that will not contaminate the composite sheet 106 and/or the composite charge 116. Thus, the composite sheet 106 and/or the composite charge 116 may be in direct physical contact with a structures and surface without a requirement of backing paper between the composite sheet 106 and/or the composite charge 116 and the structures and surfaces.

Referring still to FIGS. 1-4, in one or more examples, the controller 206 includes any suitable structure that is adapted, configured, and/or programmed to automatically control the operation of at least a portion or at least one operational component of the system 100. In one or more examples, the controller 206 includes a number of control units in which each control unit is dedicated to the operation of at least one component of the system 100. Examples of the controller 206 (e.g., of the control units) include, but are not limited to, an electronic controller, a dedicated controller, a special-purpose controller, a personal computer, a display device, a logic device, and/or a memory device. In one or more examples, the controller 206 is programmed to perform one or more algorithms to automatically control the operation of the system 100. For example, the algorithms are based upon and/or cause the controller 206 to direct the system 100 to perform the operational steps of the method 1000 (e.g., as shown in FIG. 16) and/or any suitable portion thereof.

In one or more examples, the controller 206 is programmed to automatically control the operation of the sheet-locating device 108. For example, the controller 206 instructs or directs the sheet-locating device 108 to extend the second sheet-portion 112 past support-surface edge 156, to regulate a width of the second sheet-portion 112, and/or to regulate a width of the composite charge 116 that is formed from the composite sheet 106 by the system 100.

In one or more examples, the controller 206 is programmed to automatically control the operation of the separation device 114. For example, the controller 206 instructs or directs the separation device 114 to separate the second sheet-portion 112 from the first sheet-portion 110, to separate the third sheet-portion 148 from the second sheet-portion 112, and/or to provide power to the separation device 114 during separation of composite charge 116 from the composite sheet 106.

In one or more examples, the controller 206 is programmed to automatically control the operation of the conveyance device 138. For example, the controller 206 instructs or directs the conveyance device 138 to selectively translate the second support surface 166, the third support surface 178 (e.g., when present), the separation device 114, and/or the compaction device 124 relative to the support surface 104 and/or along the support-surface edge 156.

In one or more examples, the controller 206 is configured to coordinate the operation of sheet-locating device 108, the separation device 114, and/or the conveyance device 138 such that the second sheet-portion 112, the third sheet-portion 148 and, thus, the composite charge 116 have a desired width and/or width profile along a length thereof. In one or more examples, the controller 206 is configured to coordinate the operation of the sheet-locating device 108, the separation device 114, the conveyance device 138, and the tool-positioning device 126 such that the composite charge 116 is formed (e.g., cut), placed (e.g., aligned) on the layup surface 122, and compacted (e.g., stacked) onto the layup surface 122.

During operation of the system 100, the layup tool 118 and the layup surface 122 are configured to receive and compact a plurality of composite charges 116 to form the stack 216 of composite charges 116. The stack 216 of composite charges 116 forms the composite stiffener 102 (e.g., as shown in FIGS. 12-14). For example, the above-described process and/or one or more operations thereof may be repeated any suitable number of times to sequentially separate the composite sheet 106 to form the plurality of composite charges 116 and locate and compact the plurality of composite charges 116 on the layup surface 122 to form the stack 216 of composite charges 116 that forms at least a portion of the composite stiffener 102. In addition, the width of each one of the plurality of composite charges 116 may progressively (or systematically) change, vary, and/or decrease within the stack 216, thereby forming, or defining, a desired cross-sectional shape for the composite stiffener 102. Further, the width profile of one or more of the plurality of composite charges 116 may selectively change and/or vary along the length of the stack 216, thereby forming, or defining, a desired profile shape 212 of one or both edges 252, 254 or sides 256, 258 for the composite stiffener 102.

Referring now to FIGS. 12-14, by way of examples, the present disclosure is also directed to the composite stiffener 102 formed utilizing the system 100 and/or in accordance with the method 1000. In one or more examples, the composite stiffener 102 includes a plurality of composite charges 116. In one or more examples, each one of the plurality of composite charges 116 is formed utilizing the system 100 and/or in accordance with the method 1000.

Referring to FIG. 12, which schematically illustrates an end view of an example of the composite stiffener 102 formed on an example of the layup tool 118. In one or more examples, the plurality of composite charges 116 vary in width. In one or more examples, this variation in width causes the composite stiffener 102 to have a stepped, tapered, and/or quasi-trapezoidal cross-sectional shape. As described herein, the variations in the width of the plurality of composite charges 116 are formed using the sheet-locating device 108 and/or the separation device 114. In one or more examples, the sidewalls of the composite stiffener 102 are not necessarily linear. For example, the trapezoidal shape of the composite stiffener 102, in end view) essentially has curved side walls, where each stair step steps inwards at a different amount.

Referring to FIG. 13, which schematically illustrates a side view of an example of the composite stiffener 102 formed on an example of the layup tool 118. In one or more examples, the composite stiffener 102 has a longitudinal axis 210 and a curvature along the longitudinal axis 210. For example, the longitudinal axis 210 of the composite stiffener 102 is curved (e.g., nonlinear). As described herein, the curvature of the composite stiffener 102 is formed using the layup tool 118 that includes a layup surface 122 that is curved.

In one or more examples, the thickness of the composite stiffener 102 varies throughout its length, such that the curvature of the layup surface 122 is not necessarily representative of the curvature of the top of the composite stiffener 102. For example, each composite charge 116 (e.g., each layer) of the stack 216 has a different length such that the composite stiffener 102 tapers at the ends (e.g., in side view as shown in FIG. 13) or the thickness undulates throughout the length of the composite stiffener 102. As an example, short length composite charges 116 can be laid on top of long length composite charges 116, or vise-versa, creating a local curvature through the composite stiffener 102.

In one or more examples, the height of the composite stiffener 102 (e.g., the number of composite charges 116, or layers, of the stack 216) varies throughout the length of the composite stiffener 102. In one or more examples, the composite stiffener 102 tapers toward the ends such that the composite charges 116 toward the top of the stack 216 tend to be shorter. In one or more examples, the composite charges 116 in the middle of the stack 216 can be shorter, with longer composite charges 116 laid up over them, thereby resulting in intentional "bumps" along the length of the composite stiffener 102.

Referring to FIG. 14, which schematically illustrates a top view of an example of the composite stiffener 102 formed on an example of the layup tool 118. In one or more examples, the composite stiffener 102 is elongated (e.g., is long in relation to width). In one or more examples, the composite stiffener 102 has a variable cross-sectional shape along a longitudinal length 208 of the composite stiffener 102. For example, the profile shape 212 of one or both edges 252, 254, or sides 256, 258, of one or more of the plurality of composite charges 116 forming the composite stiffener 102 is nonlinear or includes at least one curved or contoured portion. In other words, one or more of the plurality of composite charges 116 has a variable width profile along a length of the composite charge 116. However, examples of the composite stiffener 102 having a constant cross-sectional shape along the longitudinal length 208 of the composite stiffener 102 are also contemplated and are within the scope of the present disclosure. In one or more examples, the composite stiffener 102 has a symmetrical cross-sectional shape. In one or more examples, the composite stiffener 102 has an asymmetrical cross-sectional shape. As described herein, the variations in the profile shape 212 of one or both edges 252, 254, or sides 256, 258, of the composite charge 116 are formed using the separation device 114.

The composite sheet 106 includes, or is formed from, any suitable composite material and may have any suitable shape and/or configuration. In one or more examples, the composite sheet 106 is a substantially planar sheet of composite material. In one or more examples, the composite sheet 106 includes, or is formed from, a number of plies or layers of composite material. As an example, the composite sheet 106 includes at least 2 plies of composite material, such as at least 4 plies of composite material. However, in other examples, the composite sheet 106 can include 1 ply of composite material or more than 4 plies of composite material.

The composite sheet 106 is formed using any suitable technique. In one or more examples, the composite sheet 106 is formed on the support surface 104. In one or more examples, the composite sheet 106 is formed using a composite tape lamination machine (CTLM), an automated fiber placement (AFP) machine, or the like.

In one or more examples, the composite sheet 106 includes, or is formed from, a plurality of lengths of reinforcing fiber and a resin material (e.g., lengths of fiber tape). In one or more examples, the reinforcing fiber is formed from any suitable fiber material. Examples of the fiber material includes, but are not limited to, carbon, glass, aramid, titanium, aluminum, metal, and the like. Examples of the resin material include, but are not limited to, an epoxy, a polymeric material, a thermoset material, a thermoplastic material, and the like.

In one or more examples, the composite sheet 106 includes a plurality of plies of composite material. Each one of the plurality of plies includes a plurality of lengths of reinforcing fiber (e.g., lengths of fiber tape). In one or more examples, each one of the plurality of plies has the same fiber orientation. In one or more examples, at least one of the plurality of plies has a fiber orientation that is different from at least another one of the plurality of plies. The composite charge 116 is formed from the composite sheet 106, such as by separating (e.g., cutting) a fraction of the composite sheet 106 from a remainder of the composite sheet 106, as described herein. As such, the composite charge 116 includes, or is formed from, the plurality of plies of composite material and has the same fiber orientation as the composite sheet 106.

In one or more examples, each one of the composite charges 116 forming the stack 216 has a fiber orientation with respect to the longitudinal axis 210 of the composite stiffener 102. The fiber orientation of at least one of the composite charges 116 is different than the fiber orientation of at least another one of the composite charges 116 in the stack 216. As examples, the fiber orientation of each one of the composite charges 116 is arranged at an approximate angle of 0 degrees, −30 degrees, −45 degrees, −60 degrees, 90 degrees, 60 degrees, 45 degrees, 30 degrees, and/or any other suitable angle with respect to the longitudinal axis 210 of the composite stiffener 102.

It can therefore be appreciated that a plurality of composite sheets 106 having different fiber orientations must be formed, located, and separated in order to form the plurality of composite charges 116 having the desired arrangement of fiber orientations through the stack 216, in which each composite sheet 106 has a fiber orientation corresponding to the desired fiber orientation of the composite charge 116 formed from the composite sheet 106. As such, having to repeat the forming, locating, and separating operations for the composite sheet 106 to form each one of the composite charges 116 having a different fiber orientation can undesirably increase manufacturing time, cost, and waste.

The present disclosure recognizes that while the composite stiffener 102 has different fiber orientations of the composite charges 116 through the thickness of the stack 216, in certain circumstances, a plurality of composite stiffeners 102 have the same arrangement of fiber orientations through the stack 216. As such, the disclosed system 100 and method 1000 enable a plurality of composite charges 116, having the same fiber orientation, to be formed from a single composite sheet 106. Each one of the plurality of composite charges 116, having the same fiber orientation, is placed and compacted on the layup surface 122 of an associated one of a plurality of layup tools 118, which are sequentially cycled through the system 100. This process is repeated for each subsequent composite charge 116 of the stack 216 until a plurality of composite stiffeners 102 is formed.

Figure 15:
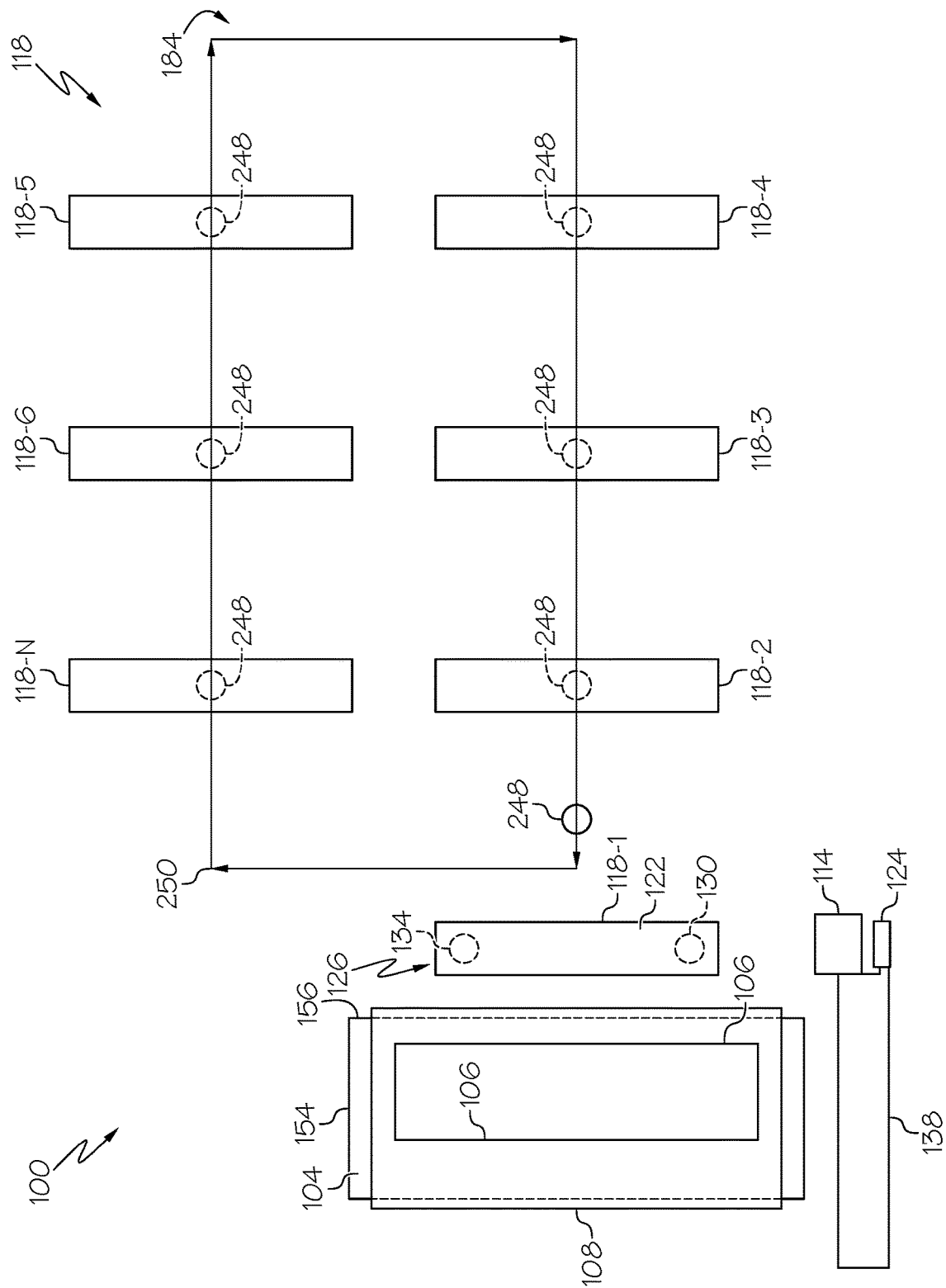
FIG. 15 is a schematic top view of an example of the system.
Figure 16:
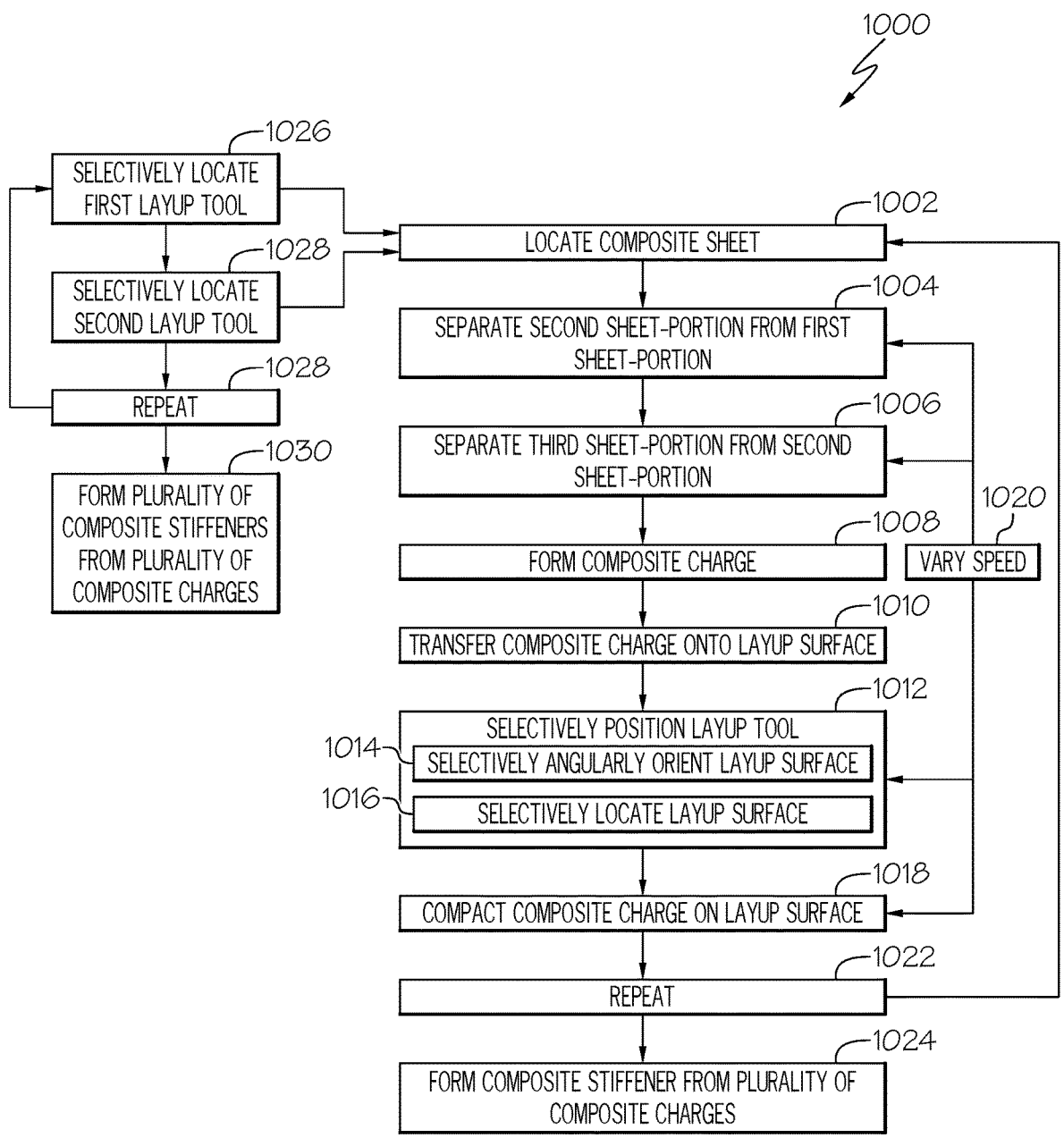
FIG. 16 is a flow diagram of an example of a method of forming the composite stiffener.

Referring to FIG. 15, which schematically illustrates an example of the system 100 used to form a plurality of composite stiffeners 102. In one or more examples, the system 100 includes a carousel 184 and a plurality of layup tools 118 (identified individually as layup tool 118-1 through 118-N). Each one of the plurality of layup tools 118 is supported by the carousel 184. The carousel 184 is configured to selectively locate one (e.g., each one) of the plurality of layup tools 118 relative to the support surface 104.

The carousel 184 includes any suitable structure, mechanism, or system that is configured to selectively move and locate each one of the plurality of layup tools 118 relative to the support surface 104 and/or the tool-positioning device 126. As an example, the carousel 184 includes an automated carousel assembly or system that is configured to sequentially transfer each one of the plurality of layup tools 118 into a work position and out of the work position.

In one or more examples, the carousel 184 includes a plurality of carousel supports 248. Each one of the plurality of carousel supports 248 is configured to retain and support one of the plurality of layup tools 118. The carousel 184 also includes a continuous line 250. The line 250 is configured to transfer (e.g., intermittently move) each one of the plurality of carousel supports 248 and, thus, each one of the plurality of layup tools 118.

In one or more examples, the tool-positioning device 126 is configured to transfer the layup tool 118 from the carousel support 248 and position the layup tool 118 relative to the support surface 104. Subsequently, the composite charge 116 is formed from the composite sheet 106 and is placed and compacted on the layup surface 122 of the layup tool 118 as described herein. In one or more examples, the carousel support 248 is configured to transfer the layup tool 118 to the tool-positioning device 126 for positioning the layup tool 118 relative to the support surface 104. Subsequently, the composite charge 116 is formed from the composite sheet 106 and is placed and compacted on the layup surface 122 of the layup tool 118 as described herein.

In this manner, the system 100 enables a first plurality of composite charges 116, having a first fiber orientation, to be formed from a first composite sheet 106. Each one of the first plurality of composite charges 116, having the first fiber orientation, is sequentially formed, placed, and compacted on the layup surface 122 of one of the plurality of layup tools 118 as the plurality of layup tools 118 cycle along the carousel 184. Subsequently, the system 100 enables a second plurality of composite charges 116, having a second fiber orientation that is different from the first fiber orientation, to be formed from a second composite sheet 106. Each one of the second plurality of composite charges 116, having the second fiber orientation, is sequentially formed, placed, and compacted on one of the first plurality of composite charges 116 that is present on the layup surface 122 of one of the plurality of layup tools 118 as the plurality of layup tools 118 again cycles along the carousel 184. This process is repeated a suitable number of times until a plurality of composite stiffeners 102 is formed, each one of the plurality of composite stiffeners 102 having the desired arrangement of fiber orientations along the stack 216 of composite charges.

Referring now to FIG. 16, which illustrates a flowchart of an example of the method 1000. In one or more examples, the method 1000 is performed utilizing the system 100.

In one or more examples, the method 1000 includes (e.g., begins with) a step of (block 1002) locating the composite sheet 106. The composite sheet 106 is located on the support surface 104 such that the first sheet-portion 110 of the composite sheet 106 is supported on the support surface 104 and the second sheet-portion 112 of the composite sheet 106 extends beyond the support surface 104.

In one or more examples, the composite sheet 106 is initially supported by the support surface 104. In one or more examples, the step of (block 1002) locating the composite sheet 106 includes a step of forming the composite sheet 106 on the support surface 104. In one or more examples, the step of (block 1002) locating the composite sheet 106 includes a step of placing the composite sheet 106 that has been previously formed (e.g., a pre-formed composite sheet) on the support surface 104. In one or more examples, the composite sheet 106 is formed using an automated fiber placement machine.

In one or more examples, the step of (block 1002) locating the composite sheet 106 includes a step of moving (e.g., translating) the composite sheet 106 such that the first sheet-portion 110 of the composite sheet 106 is supported on the support surface 104 and the second sheet-portion 112 of the composite sheet 106 extends beyond the support surface 104 (e.g., is cantilevered over the support-surface edge 156). In one or more examples, the step of moving the composite sheet 106 includes a step of moving the composite sheet 106 such that the second sheet-portion 112 has a selected, predetermined, preselected, and/or predefined width. In one or more examples, the step of moving the composite sheet 106 includes a step of moving the composite sheet 106 such that the composite charge 116 that is formed has a selected, predetermined, preselected, and/or predefined width. In one or more examples, the step of (block 1002) locating the composite sheet 106 is accomplished in any suitable manner. In one or more examples, the composite sheet 106 is moved and/or located using the sheet-locating device 108.

In one or more examples, the step of (block 1002) locating the composite sheet 106 includes a step of supporting the composite sheet 106. In one or more examples, after locating the composite sheet 106, the first sheet-portion 110 is supported by the support surface 104 and the second sheet-portion 112 is supported by the second support surface 166. In one or more examples, after locating the composite sheet 106, the first sheet-portion 110 is supported by the support surface 104, the second sheet-portion 112 is supported by the second support surface 166, and the third sheet-portion 148 is supported by the third support surface 178.

In one or more examples, after locating the composite sheet 106, the second sheet-portion 112 is supported by the sheet-support mechanism 140. For example, a portion of the second sheet-portion 112 along the length of the composite sheet 106 that is not supported by the second support surface 166 is supported by sheet-support mechanism 140. In one or more examples, after locating the composite sheet 106, the second sheet-portion 112 and the third sheet-portion 148 are supported by the sheet-support mechanism 140. For example, a portion of the second sheet-portion 112 along the length of the composite sheet 106 that is not supported by the second support surface 166 is supported by sheet-support mechanism 140 and a portion of the third sheet-portion 148 along the length of the composite sheet 106 that is not supported by the third support surface 178 is supported by sheet-support mechanism 140.

In one or more examples, the method 1000 includes a step of (block 1004) separating the second sheet-portion 112 from the first sheet-portion 110. Separating the second sheet-portion 112 from the first sheet-portion 110 at least partially forms the composite charge 116. For example, separating the second sheet-portion 112 from the first sheet-portion 110 forms one (e.g., the first) edge 252, or side 256, of the composite charge 116. In one or more examples, a step of (block 1004) separating the second sheet-portion 112 from the first sheet-portion 110 includes separating in any suitable manner. In one or more examples, the second sheet-portion 112 is separated from the first sheet-portion 110 using the separation device 114.

In one or more examples, the step of (block 1004) separating the second sheet-portion 112 from the first sheet-portion 110 includes a step of separating (e.g., cutting) the composite sheet 106 along the separation line 142. In one or more examples, the separation line 142 is continuous and nonlinear. For example, separating of the second sheet-portion 112 from the first sheet-portion 110 along the separation line 142 that is continuous and nonlinear forms the first edge 252, or side 256, of the composite charge 116 that is nonlinear or that includes profile shape 212 (e.g., as shown in FIG. 14) that has at least one curved or contoured portion.

In one or more examples, the method 1000 includes a step of (block 1006) separating the third sheet-portion 148 of the composite sheet 106 from the second sheet-portion 112. Separation of the third sheet-portion 148 from the second sheet-portion 112 forms the composite charge 116. For example, separating the second sheet-portion 112 from the first sheet-portion 110 forms the first edge 252, or the first side 256, of the composite charge 116 and separating the third sheet-portion 148 from the second sheet-portion 112 forms the opposing second edge 254, or second side 258, of the composite charge 116. In one or more examples, step of (block 1006) separating the third sheet-portion 148 from the second sheet-portion 112 includes separating in any suitable manner. In one or more examples, the third sheet-portion 148 is separated from the second sheet-portion 112 using the separation device 114.

In one or more examples, the step of (block 1006) separating the third sheet-portion 148 from the second sheet-portion 112 includes a step of separating (e.g., cutting) the composite sheet 106 along the second separation line 150. In one or more examples, the second separation line 150 is continuous and nonlinear. For example, separating of the third sheet-portion 148 from the second sheet-portion 112 along the second separation line 150 that is continuous and nonlinear forms the second edge 254, or second side 258, of the composite charge 116 that is nonlinear or that includes profile shape 212 (e.g., as shown in FIG. 14) that has at least one curved or contoured portion.

In one or more examples, the step of (block 1004) separating includes a step of conveying (e.g., translating) the separation device 114 and the second support surface 166 along the support surface 104 to separate the second sheet-portion 112 from the first sheet-portion 110. In one or more examples, the step of conveying the separation device 114 and the second support surface 166 is accomplished in any suitable manner. In one or more examples, the separation device 114 and the second support surface 166 are conveyed using the conveyance device 138.

In one or more examples, the step of (block 1006) separating includes a step of conveying (e.g., translating) the separation device 114 and the third support surface 178 to separate the third sheet-portion 148 from the second sheet-portion 112. In one or more examples, the step of conveying the separation device 114 and the third support surface 178 is accomplished in any suitable manner. In one or more examples, the separation device 114 and the third support surface 178 are conveyed using the conveyance device 138.

Accordingly, in one or more examples, the method 1000 includes a step of (block 1008) forming the composite charge 116. The composite charge 116 is formed by locating the composite sheet 106 and separating the second sheet-portion 112 from the first sheet-portion 110 and, optionally, separating the third sheet-portion 148 from the second sheet-portion 112.

In one or more examples, the method 1000 includes a step of (block 1010) transferring (e.g., conveying) the composite charge 116 onto the layup surface 122 of the layup tool 118. In one or more examples, the step of (block 1010) transferring the composite charge 116 onto the layup surface 122 includes a step of locating and/or placing the composite charge 116 on the layup surface 122. In one or more examples, the step of (block 1010) transferring the composite charge 116 onto the layup surface 122 is performed substantially concurrently with the step of (block 1004) separating the second sheet-portion 112 from the first sheet-portion 110 and with the step of (block 1006) separating the third sheet-portion 148 from the second sheet-portion 112 (e.g., when performed). In one or more examples, the step of (block 1010) transferring the composite charge 116 onto the layup surface 122 is accomplished in any suitable manner. In one or more examples, the composite charge 116 is transferred onto the layup surface 122 using the charge-transition device 172.

In one or more examples, the layup surface 122 includes the curvature along the longitudinal tool-axis 120 of the layup tool 118. The curvature of the layup surface 122 imparts a curvature to the composite charge 116 that is placed and compacted on the layup surface 122 and, thus, imparts a curvature to the composite stiffener 102 formed from the stack of composite charges 116 (e.g., as shown in FIG. 13).

In one or more examples, the method 1000 includes a step of (block 1012) selectively positioning the layup tool 118. The layup tool 118 is selectively positioned relative to the compaction device 124 such that the compaction force 128, applied to the composite charge 116 by the compaction device 124, is normal to the layup surface 122. Selective positioning of the layup surface 122 relative to the compaction device 124 accounts for the curvature in the layup surface 122 when the composite charge 116 is placed and compacted onto the layup surface 122. In one or more examples, the step of (block 1012) selectively positioning the layup tool 118 is accomplished in any suitable manner. In one or more examples, the layup tool 118 is selectively positioned using the tool-positioning device 126.

According to the method 1000, in one or more examples, the step of (block 1012) selectively positioning the layup tool 118 includes a step of (block 1014) selectively adjusting the angular orientation of (e.g., selectively rotating) the layup surface 122. The angular orientation of the layup surface 122 is selectively adjusted relative to the compaction device 124 such that the compaction force 128, applied to the composite charge 116 by the compaction device 124, is normal to the layup surface 122. In one or more examples, the step of (block 1012) selectively positioning the layup tool 118 includes a step of (block 1016) selectively locating (e.g., linearly translating) the layup surface 122. The location of the layup surface 122 is selectively located relative to the compaction device 124 such that the compaction force 128, applied to the composite charge 116 by the compaction device 124, is normal to the layup surface 122. In one or more examples, the step of (block 1014) selectively adjusting the angular orientation of the layup surface 122 and/or the step of (block 1016) selectively locating the layup surface 122 is accomplished in any suitable manner. In one or more examples, the angular orientation and the location of the layup surface 122 is selectively adjusted using the tool-positioning device 126, such as the first actuator 130 and the second actuator 134 (e.g., as shown in FIGS. 5-7).

In one or more examples, the method 1000 includes a step of (block 1018) compacting the composite charge 116 on the layup surface 122. Compacting the composite charge 116 on the layup surface 122 forms a portion of the composite stiffener 102. For examples, the compacted composite charge 116 forms one layer of the stack 216 (e.g., stacked plurality) of composite charges 116 that forms the composite stiffener 102. In one or more examples, the step of (block 1018) compacting the composite charge 116 on the layup surface 122 is performed substantially concurrently with or immediately after the step of (block 1004) separating the second sheet-portion 112 from the first sheet-portion 110 and with the step of (block 1006) separating the third sheet-portion 148 from the second sheet-portion 112 (when performed). In one or more examples, step of (block 1018) compacting the composite charge 116 on the layup surface 122 includes compacting in any suitable manner. In one or more examples, the composite charge 116 is compacted on the layup surface 122 using the compaction device 124.

In one or more examples, the method 1000 includes a step of (block 1020) varying a speed of the step of (block 1004) separating the second sheet-portion 112 from the first sheet-portion 110, the step of (block 1006) separating the third sheet-portion 148 from the second sheet-portion 112 (e.g., when performed), and/or the step of (block 1018) compacting the composite charge 116 on the layup surface 122. In one or more examples, varying the speed of the separating and/or compacting steps is based, at least in part, on a speed of the step of (block 1012) selectively positioning the layup tool 118. In one or more examples, the step of (block 1020) varying the speed is accomplished in any suitable manner. In one or more examples, the speed of the steps of (block 1004 and 1006) separating and/or the step of (block 1018) compacting is varying and/or controlled using the controller 206, the motion-control device 158, the feedback mechanism 214, or a combination thereof.

In one or more examples, the method 1000 includes a step of (block 1022) repeating a number of steps or any suitable portion of the method 1000. In one or more examples, the step of (block 1022) repeating includes repeating the step of (block 1002) locating, the step of (block 1004) separating, the step of (block 1006) separating (when performed), the step of (block 1010) transferring, the step of (block 1012) selectively positioning, and the step of (block 1018) compacting to sequentially form and locate a plurality of composite charges 116 on the layup surface 122 and/or to form the stack 216 of composite charges 116. The stack 216 of the composite charges 116 forms the composite stiffener 102. Thus, the method 1000 includes (e.g., concludes with) a step of (block 1024) forming the composite stiffener 102 from the stack 216 of the composite charges 116 (e.g., the plurality of composite charges 116 placed and compacted in a stacked configuration).

In one or more examples, the method 1000 may include various other operational and/or processing steps performed when forming the composite charge 116 and/or forming the composite stiffener 102.

In one or more examples, the method 1000 includes a step of detecting one or more parameters of the composite sheet 106, the composite charge 116, and/or the system 100. As examples, the step of detecting includes, but is not limited to, detecting the location of the composite sheet 106 relative to the support surface 104, detecting the location of the composite charge 116 on the layup surface 122, detecting the width of the composite charge 116, detecting the location of the separation device 114 (e.g., the cutter 144 and/or the second cutter 152), detecting the cutting angle of the separation device 114 (e.g., of the cutter 144 and/or the second cutter 152), detecting the position of the layup tool 118 and/or the layup surface 122, detecting the location and/or linear velocity of the separation device 114 and/or the compaction device 124, detecting the rotational velocity and/or the linear velocity of the layup tool 118, and the like. In one or more examples, the step of detecting is accomplished in any suitable manner. In one or more examples, one or more parameters of the composite sheet 106, the composite charge 116, and/or the system 100 is detected using the detection device 174.

In one or more examples, the method 1000 includes a step of regulating one or more parameters of the parameters of the composite sheet 106, the composite charge 116, and/or the system 100. As examples, the step of regulating includes, but is not limited to, regulating the location of the composite sheet 106 relative to the support surface 104, regulating the location of the composite charge 116 on the layup surface 122, regulating the width of the composite charge 116, regulating the location of the separation device 114 (e.g., the cutter 144 and/or the second cutter 152), regulating the cutting angle of the separation device 114 (e.g., of the cutter 144 and/or the second cutter 152), regulating the position of the layup tool 118 and/or the layup surface 122, regulating the location and/or linear velocity of the separation device 114 and/or the compaction device 124, regulating the rotational velocity and/or the linear velocity of the layup tool 118, and the like. In one or more examples, the step of regulating is accomplished in any suitable manner. In one or more examples, one or more parameters of the composite sheet 106, the composite charge 116, and/or the system 100 is detected using the detection device 174.

In one or more examples, the method 1000 includes a step of maintaining tension on the composite charge 116 to permit and/or facilitate the step of (block 1010) transferring the composite charge 116. In one or more examples, the step of maintaining is performed substantially concurrently with the steps of (blocks 1004 and 1006) separating and/or with the step of (block 1010) transferring. In one or more examples, the step of maintaining is accomplished in any suitable manner. In one or more examples, tension on the composite charge 116 is maintained using and/or controlling one or more feed rollers.

In one or more examples, the method 1000 includes a step of forming the scrap 192 of composite material that is not transferred onto the layup surface 122 (e.g., the third sheet-portion 148). In one or more examples, the method 1000 includes a step of transferring the scrap 192 to the scrap bin 188, for example, using the scrap-transition device 190.

Referring generally to FIG. 15 and particularly to FIG. 16, in one or more examples, the method 1000 enables a plurality of composite stiffeners 102 to be sequentially formed on a plurality of layup tools 118 using the carousel 184 (e.g., as illustrated in FIG. 15).

In one or more examples, the method 1000 includes a step of (block 1026) selectively locating a first layup tool 118-1 (e.g., a first one of the plurality of layup tools 118). The first layup tool 118-1 is selectively located adjacent to the support surface 104. In one or more examples, the first layup tool 118-1 is supported by the carousel support 248 and is transferred along the line 250 by the carousel 184 to the tool-positioning device 126. Subsequently, the first layup tool 118-1 is transferred from the carousel support 248 to the tool-positioning device 126. Subsequently, the tool-positioning device 126 positions the first layup tool 118-1 relative to the support surface 104.

In one or more examples, the method 1000 includes a step of performing the step of (block 1002) locating the composite sheet 106 (e.g., a first composite sheet 106 having a first fiber orientation), the step of (block 1004) separating the second sheet-portion 112 from the first sheet-portion 110, the step of (block 1006) separating the third sheet-portion 148 from the second sheet-portion 112 (e.g., when performed), the step of (block 1010) transferring the composite charge 116 (e.g., a first composite charge 116 having the first fiber orientation), the step of (block 1012) selectively positioning the layup tool 118, and the step of (block 1018) compacting the composite charge 116 to form a portion (e.g., a first layer of a first stack 216 of composite charges 116) of a first one of the plurality of composite stiffeners 102 to be built on the first layup tool 118-1. In this way, the first composite charge 116 is formed from the first composite sheet 106 and is placed and compacted on the layup surface 122 of the first layup tool 118-1.

The method 1000 includes a step of moving the first layup tool 118-1 away from the support surface 104 after performing the step of (block 1002) locating, the step of (block 1004) separating, the step of (block 1006) separating (e.g., when performed), the step of (block 1010) transferring, the step of (block 1012) selectively positioning, and the step of (block 1018) compacting. In one or more examples, the first layup tool 118-1 is transferred from the tool-positioning device 126 to the carousel support 248. Subsequently, the first layup tool 118-1 is transferred along the line 250 by the carousel 184.

In one or more examples, the method 1000 includes a step of (block 1028) selectively locating a second layup tool 118-2 (e.g., a second one of the plurality of layup tools 118). The second layup tool 118-2 is selectively located adjacent to the support surface 104. In one or more examples, the second layup tool 118-2 is supported by the carousel support 248 and is transferred along the line 250 by the carousel 184 to the tool-positioning device 126. Subsequently, the second layup tool 118-2 is transferred from the carousel support 248 to the tool-positioning device 126. Subsequently, the tool-positioning device 126 positions the second layup tool 118-2 relative to the support surface 104.

In one or more examples, the method 1000 includes a step of performing the step of (block 1002) locating the composite sheet 106 (e.g., the first composite sheet 106 having the first fiber orientation, the step of (block 1004) separating the second sheet-portion 112 from the first sheet-portion 110, the step of (block 1006) separating the third sheet-portion 148 from the second sheet-portion 112 (e.g., when performed), the step of (block 1010) transferring the composite charge 116 (e.g., a second composite charge 116 having the first fiber orientation), the step of (block 1012) selectively positioning the layup tool 118, and the step of (block 1018) compacting the composite charge 116 to form a portion (e.g., a first layer of a second stack 216 of composite charges 116) of a second one of the plurality of composite stiffeners 102 to be built on the second layup tool 118-2. In this way, the second composite charge 116 is formed from the first composite sheet 106 and is placed and compacted on the layup surface 122 of the second layup tool 118-2.

In one or more examples, the method 1000 includes a step of (block 1028) repeating a number of steps or any suitable portion of the method 1000. In one or more examples, the step of (block 1028) repeating includes repeating the step of (block 1026) locating, the step of (block 1028) locating, the step of (block 1002) locating, the step of (block 1004) separating, the step of (block 1006) separating (e.g., when performed), the step of (block 1010) transferring, the step of (block 1012) selectively positioning, and the step of (block 1018) compacting to sequentially form and locate a plurality of composite charges 116 on the layup surface 122 of the first layup tool 118-1 and the second layup tool 118-2. Thus, the method 1000 includes (e.g., concludes with) a step of (block 1030) forming the plurality of composite stiffeners 102 from the plurality of composite charges 116.

In one or more examples, in each subsequent step of (block 1028) repeating, the repeated step of (block 1002) locating the composite sheet 106 includes a step of locating a subsequent (e.g., a second, third, fourth, etc.) one of a plurality of composite sheets 106 that has a fiber orientation that is different than the first fiber orientation of the first composite sheet 106. In this way, each subsequent composite charge 116 that is formed, placed, and compacted on each one of the plurality of layup tools 118 may have a fiber orientation according to the fiber arrangement of the stack 216. However, a plurality of composite charges 116 having the same fiber orientation can be formed from the same composite sheet 106.

While the portion of method 1000 described above only references the first layup tool 118-1 and the second layup tool 118-2, the method 1000 can be performed using any suitable number of layup tools 118 (e.g., as shown as layup tools 118-1 through layup tool 118-N in FIG. 15).

Figure 17:
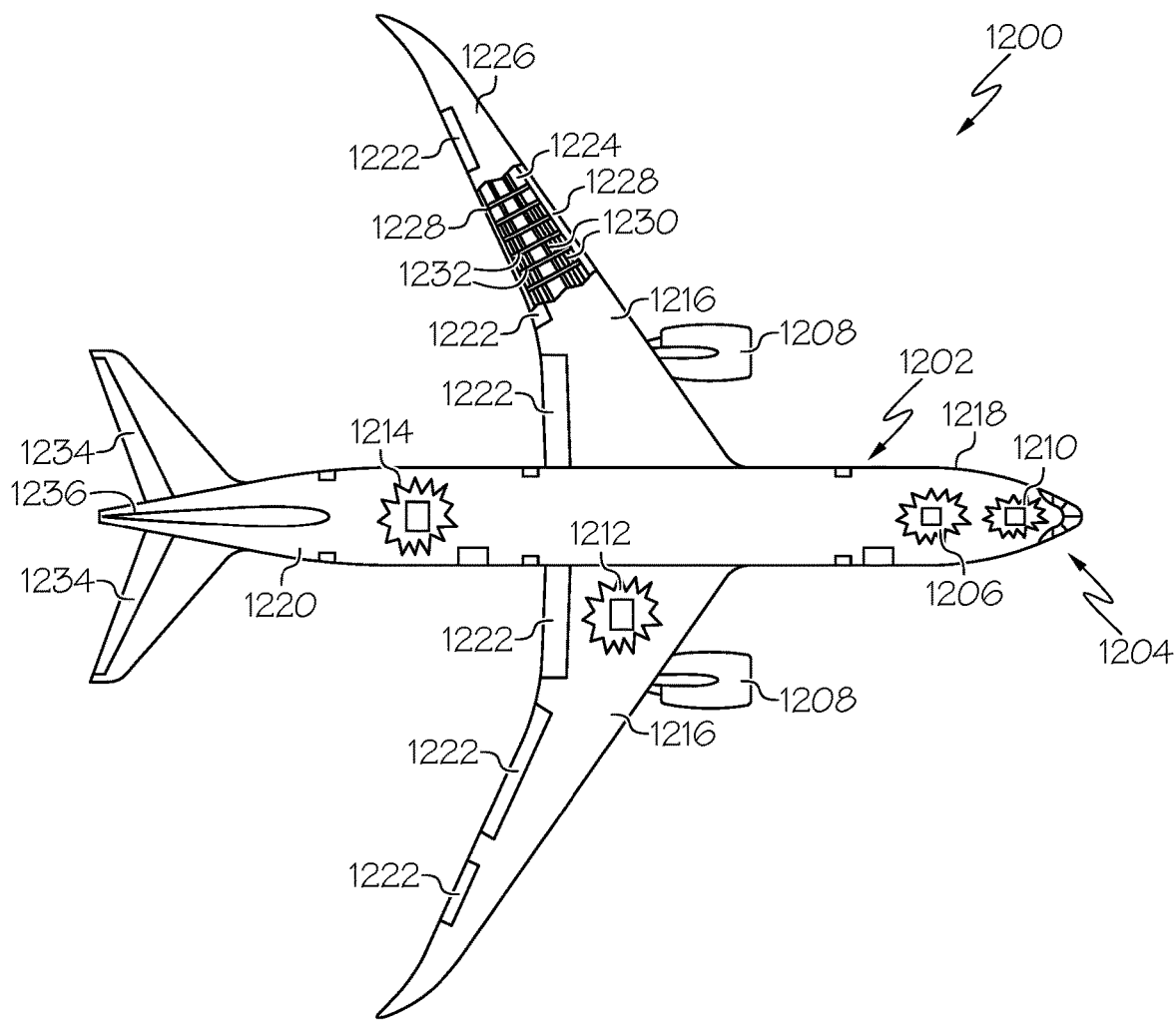
FIG. 17 is a schematic illustration of an example of an aircraft.
Figure 19:
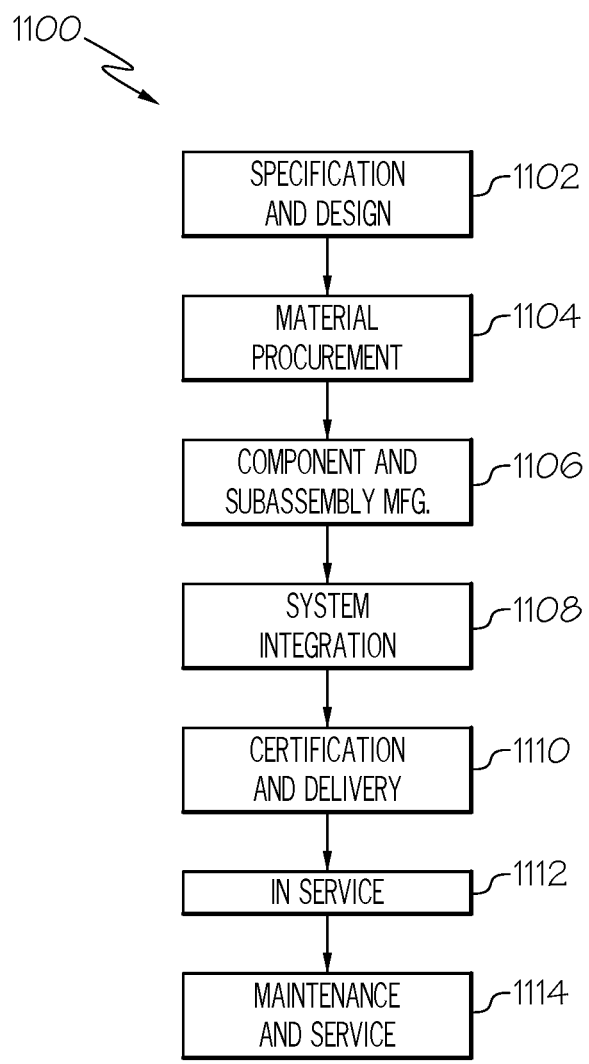
FIG. 19 is a flow diagram of an aircraft manufacturing and service methodology.

Referring now to FIGS. 17 and 19, examples of the system 100 and the method 1000 may be related to, or used in the context of, an aircraft manufacturing and service method 1100, as shown in the flow diagram of FIG. 19 and the aircraft 1200, as schematically illustrated in FIG. 17. For example, the aircraft 1200 and/or the aircraft production and service methodology 1100 may utilize the composite stiffener 102 that is formed, fabricated, and/or manufactured according to the method 1000 and/or using the system 100 described herein and illustrated in FIGS. 1-16.

The present disclosure recognizes that composite structures can be advantageous in the manufacture of the aircraft 1200 to decrease the weight of the aircraft 1200 and provide longer service life for various components of the aircraft 1200. In manufacturing composite structures, such as the composite stiffener 102, layers of composite material (e.g., the composite charges 116) are typically laid up on a tool (e.g., the layup tool 118). Often, each layer of composite material includes a fiber sheet that may be infused or pre-impregnated with a matrix material (commonly referred to as prepreg). The different layers of composite material may be laid up in different orientations, for example, having different fiber orientations, and different numbers of layers may be used depending on the performance requirements of the composite structure being manufactured. The examples of the system 100 and the method 1000 disclosed herein can improve the efficiency and cost associated with forming such composite structures, such as the composite stiffener 102.

Referring to FIG. 17, examples of the aircraft 1200 include an airframe 1202 having the interior 1206. The aircraft 1200 also includes a plurality of high-level systems 1204. Examples of the high-level systems 1204 include one or more of a propulsion system 1208, an electrical system 1210, a hydraulic system 1212, and an environmental system 1214. In other examples, the aircraft 1200 may include any number of other types of systems, such as a communications system, a flight control system, a guidance system, a weapons system, and the like.

The aircraft 1200 includes a pair of wings 1216, a fuselage 1218, and a tail section 1220. Each of the wings 1216 extends outwardly from the fuselage 1218 from a respective inboard portion to a respective outboard portion, for example, in a direction generally parallel to a span-wise direction of the wings 1216. In one or more examples, the wings 1216 (or each of the wings 1216) include control surfaces 1222, a lower wing skin 1224, an upper wing skin 1226 [124], a plurality of spars 1228 (e.g., a front spar and a rear spar), a plurality of stringers 1230, and a plurality of ribs 1232. In one or more examples, the tail section 1220 includes wing-like structures, such as horizontal stabilizers 1234 and a vertical stabilizer 1236. In one or more examples, the stabilizers 1234, 1236 include upper and lower skins and one or more stringers, similar to the stringers 1230 of the wings 1216, that are structurally joined to an interior surface of the skin.

In one or more examples, the composite stiffener 102 formed according to the method 1000 and/or using the system 100 forms a component of a stiffened panel used for the airframe 1202, the wing 1216, the fuselage 1218, the stabilizers 1234, 1236, and the like. In one or more examples, the composite stiffener 102 formed according to the method 1000 and/or using the system 100 forms the stringer 1230. For example, the stringers 1230 are composite laminate structures having respective solid trapezoidal cross sections (e.g., similar to what is shown in FIGS. 12 and 18 and described with respect to the composite stiffener 102). The stringer 1230 are structurally joined to an interior surface of one or both of the lower wing skin 1224 and the upper wing skin 1226.

Referring now to FIG. 18, which schematically illustrates an example of a panel 262 that is stiffened by a plurality of the composite stiffeners 102. In one or more examples, each one of the composite stiffeners 102 includes the stack 216 of composite charges 116 (e.g., a stacked plurality of generally planar plies of reinforcement material. The composite stiffeners 102 can be any suitable dimension to provide various degrees of reinforcement and can include any suitable number of composite charges 116. In one or more examples, the stack 216 of composite charges 116 is transferred onto the panel 262, as shown in FIG. 18, to form an uncured composite stiffener 102 on the surface of the panel 262. In one or more examples, the stack 216 of composite charges 116 and the panel 262 are co-cured to form a cured composite stiffener 102.

In one or more examples, the panel 262 is an example of the lower wing skin 1224 and the composite stiffeners 102 are examples of the stringers 1230 (e.g., as shown in FIG. 17). As such, an example of the composite stiffener 102 includes the stringer 1230, such as a plank stringer, that is coupled to a surface of a wing skin. However, in other examples, implementations of the system 100 and/or method 1000 are used to form various types of composite structures. In one or more examples, the composite stiffener 102 disclosed herein may have a cross section (e.g., a sold trapezoidal cross section, as described above) with a height that is approximately half the height of 'I' or 'T' shaped cross sections of traditional carbon fiber stiffeners. This reduction in stiffener height may enable a thinner wing, as the effective separation between the upper and lower panels may be increased due to the decreased height of the trapezoidal cross section as compared to the height of conventional 'I' or 'T' shaped cross sections. In one or more examples, the system 100 and method 1000 disclosed herein can be used to build base charges on conventional "I" or "T" shaped stringers, which is essentially a short plank on which the "I" or "T" shaped stringer sits above the panel.

Referring to FIG. 19, during pre-production, the method 1100 includes specification and design of the aircraft 1200 (block 1102) and material procurement (block 1104). During production of the aircraft 1200, component and subassembly manufacturing (block 1106) and system integration (block 1108) of the aircraft 1200 take place. Thereafter, the aircraft 1200 goes through certification and delivery (block 1110) to be placed in service (block 1112). Routine maintenance and service (block 1114) includes modification, reconfiguration, refurbishment, etc. of one or more systems of the aircraft 1200.

Each of the processes of the method 1100 illustrated in FIG. 19 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

Examples of the system 100 and the method 1000 shown and described herein may be employed during any one or more of the stages of the manufacturing and service method 1100 shown in the flow diagram illustrated by FIG. 19. In an example, composite stiffeners 102, such as used as composite stringers, such as plank stringer, formed in accordance with the method 1000 and/or using the system 100 may form a portion of component and subassembly manufacturing (block 1106) and/or system integration (block 1108). Further, the composite stiffener 102 formed in accordance with the method 1000 and/or using the system 100 may be utilized in a manner similar to components or subassemblies prepared while the aircraft 1200 is in service (block 1112). Also, the composite stiffener 102 formed in accordance with the method 1000 and/or using the system 100 may be utilized during system integration (block 1108) and certification and delivery (block 1110). Similarly, the composite stiffener 102 formed in accordance with the method 1000 and/or using the system 100 may be utilized, for example and without limitation, while the aircraft 1200 is in service (block 1112) and during maintenance and service (block 1114).

Although an aerospace example is shown, the examples and principles disclosed herein may be applied to other industries, such as the automotive industry, the space industry, the construction industry, and other design and manufacturing industries. Accordingly, in addition to aircraft, the examples and principles disclosed herein may apply to other stiffened structural assemblies and systems and methods of making the same for other types of vehicles (e.g., land vehicles, marine vehicles, space vehicles, etc.) and stand-alone structures.

The preceding detailed description refers to the accompanying drawings, which illustrate specific examples described by the present disclosure. Other examples having different structures and operations do not depart from the scope of the present disclosure. Like reference numerals may refer to the same feature, element, or component in the different drawings. Throughout the present disclosure, any one of a plurality of items may be referred to individually as the item and a plurality of items may be referred to collectively as the items and may be referred to with like reference numerals. Moreover, as used herein, a feature, element, component or step preceded with the word "a" or "an" should be understood as not excluding a plurality of features, elements, components or steps, unless such exclusion is explicitly recited.

Illustrative, non-exhaustive examples, which may be, but are not necessarily, claimed, of the subject matter according to the present disclosure are provided above. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, device, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, device, structure, article, element, component, or hardware described as being "configured to" perform a particular function may additionally or alternatively be described as being "adapted to" and/or as being "operative to" perform that function.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

For the purpose of the present disclosure, the term "position" of an item refers to a location of the item in three-dimensional space relative to a fixed reference and an angular orientation of the item in three-dimensional space relative to the fixed reference frame.

As used herein, the phrase "a number of" refers to one or more items.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations. As used herein, the term "and/or" and the "/" symbol includes any and all combinations of one or more of the associated listed items.

For the purpose of this disclosure, the terms "coupled," "coupling," and similar terms refer to two or more elements that are joined, linked, fastened, attached, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the term "approximately" refers to or represent a condition that is close to, but not exactly, the stated condition that still performs the desired function or achieves the desired result. As an example, the term "approximately" refers to a condition that is within an acceptable predetermined tolerance or accuracy, such as to a condition that is within 10% of the stated condition. However, the term "approximately" does not exclude a condition that is exactly the stated condition. As used herein, the term "substantially" refers to a condition that is essentially the stated condition that performs the desired function or achieves the desired result.

FIGS. 1-15, 17 and 18, referred to above, may represent functional elements, features, or components thereof and do not necessarily imply any particular structure. Accordingly, modifications, additions and/or omissions may be made to the illustrated structure. Additionally, those skilled in the art will appreciate that not all elements, features, and/or components described and illustrated in FIGS. 1-15, 17 and 18, referred to above, need be included in every example and not all elements, features, and/or components described herein are necessarily depicted in each illustrative example. Accordingly, some of the elements, features, and/or components described and illustrated in FIGS. 1-15, 17 and 18 may be combined in various ways without the need to include other features described and illustrated in FIGS. 1-15, 17 and 18, other drawing figures, and/or the accompanying disclosure, even though such combination or combinations are not explicitly illustrated herein. Similarly, additional features not limited to the examples presented, may be combined with some or all of the features shown and described herein. Unless otherwise explicitly stated, the schematic illustrations of the examples depicted in FIGS. 1-15, 17 and 18, referred to above, are not meant to imply structural limitations with respect to the illustrative example. Rather, although one illustrative structure is indicated, it is to be understood that the structure may be modified when appropriate. Accordingly, modifications, additions and/or omissions may be made to the illustrated structure. Furthermore, elements, features, and/or components that serve a similar, or at least substantially similar, purpose are labeled with like numbers in each of FIGS. 1-15, 17 and 18, and such elements, features, and/or components may not be discussed in detail herein with reference to each of FIGS. 1-15, 17 and 18. Similarly, all elements, features, and/or components may not be labeled in each of FIGS. 1-15, 17 and 18, but reference numerals associated therewith may be utilized herein for consistency.

In FIGS. 16 and 19, referred to above, the blocks may represent operations, steps, and/or portions thereof and lines connecting the various blocks do not imply any particular order or dependency of the operations or portions thereof. It will be understood that not all dependencies among the various disclosed operations are necessarily represented. FIGS. 16 and 19 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Further, references throughout the present specification to features, advantages, or similar language used herein do not imply that all of the features and advantages that may be realized with the examples disclosed herein should be, or are in, any single example. Rather, language referring to the features and advantages is understood to mean that a specific feature, advantage, or characteristic described in connection with an example is included in at least one example. Thus, discussion of features, advantages, and similar language used throughout the present disclosure may, but do not necessarily, refer to the same example.

The described features, advantages, and characteristics of one example may be combined in any suitable manner in one or more other examples. One skilled in the relevant art will recognize that the examples described herein may be practiced without one or more of the specific features or advantages of a particular example. In other instances, additional features and advantages may be recognized in certain examples that may not be present in all examples. Furthermore, although various examples of the system 100 and method 1000 have been shown and described, modifications may occur to those skilled in the art upon reading the specification. The present application includes such modifications and is limited only by the scope of the claims.

What is claimed is:

1. A system for forming a composite stiffener, the system comprising:
   a support surface configured to support a composite sheet;
   a sheet-locating device configured to selectively locate the composite sheet such that a first sheet-portion of the composite sheet is supported on the support surface and a second sheet-portion of the composite sheet extends beyond the support surface;
   a separation device configured to separate the second sheet-portion from the first sheet-portion to at least partially form a composite charge;
   a layup tool comprising a longitudinal tool-axis and a layup surface configured to receive the composite charge, wherein the layup surface comprises a curvature along the longitudinal tool-axis;
   a compaction device configured to compact the composite charge on the layup surface; and
   a tool-positioning device coupled to the layup tool and configured to selectively position the layup tool such that a compaction force, applied to the composite charge by the compaction device, is normal to the layup surface.

2. The system of claim 1, wherein the tool-positioning device comprises:
   a first actuator coupled to the layup tool at a first location;

a second actuator coupled to the layup tool at a second location that is spaced away from the first location along the longitudinal tool-axis; and a motion-control device configured to selectively control coordinated motion of the first actuator and the second actuator to adjust an angular orientation and a location of the layup tool relative to the compaction device.

3. The system of claim 2, wherein each one of the first actuator and the second actuator comprises:
a first linear actuator configured to adjust a vertical location of the layup tool; and
a second linear actuator configured to adjust a horizontal location of the layup tool.

4. The system of the claim 2, further comprising a conveyance device configured to move the separation device and the compaction device along the support surface,
wherein the conveyance device is further configured to vary a linear velocity at which the separation device and the compaction device move along the support surface based, at least in part, on a rotational velocity at which the layup tool rotates and a linear velocity at which the layup tool translates in response to coordinated motion of the first actuator and the second actuator.

5. The system of claim 1, wherein the layup tool is removable from the tool-positioning device.

6. The system of claim 1, further comprising a sheet-support mechanism configured to support the second sheet-portion, extending beyond the support surface.

7. The system of claim 1, wherein the separation device is further configured to separate the second sheet-portion from the first sheet-portion along a separation line that is continuous and nonlinear.

8. The system of claim 1, wherein the separation device comprises:
a cutter configured to cut the composite sheet; and
a cutter-positioning device configured to selectively adjust a cutting angle of the cutter relative to the composite sheet.

9. The system of claim 8, wherein the cutter-positioning device is further configured to selectively locate the cutter relative to the composite sheet.

10. The system of claim 1, wherein the separation device is further configured to separate a third sheet-portion of the composite sheet from the second sheet-portion to form the composite charge.

11. The system of claim 10, wherein:
the separation device is further configured to:
separate the second sheet-portion from the first sheet-portion along a separation line; and
separate the third sheet-portion from the second sheet-portion along a second separation line; and
each of the separation line and the second separation line is continuous and nonlinear.

12. The system of claim 10, wherein the separation device comprises:
a cutter and a second cutter configured to cut the composite sheet, wherein the cutter and the second cutter are spaced-apart from each other; and
a cutter-positioning device configured to selectively adjust a cutting angle of the cutter and the second cutter and to selectively locate the cutter and the second cutter relative to the composite sheet.

13. The system of claim 1, further comprising:
a carousel; and
a plurality of layup tools supported by the carousel, wherein the carousel is configured to selectively locate one of the plurality of layup tools relative to the support surface.

14. A system for forming a composite stiffener, the system comprising:
a support surface configured to support a composite sheet and comprising a support-surface edge;
a sheet-locating device configured to selectively locate the composite sheet such that a first sheet-portion of the composite sheet is supported on the support surface and a second sheet-portion of the composite sheet extends past the support-surface edge;
a separation device configured to separate the second sheet-portion from the first sheet-portion and to separate a third sheet-portion of the composite sheet from the second sheet-portion to form a composite charge;
a layup tool comprising a longitudinal tool-axis and a layup surface configured to receive the composite charge, wherein the layup surface comprises a curvature along the longitudinal tool-axis;
a compaction device configured to compact the composite charge on the layup surface;
a tool-positioning device coupled to the layup tool and configured to selectively position the layup tool; and
a motion-control device configured to selectively control the tool-positioning device to adjust a position of the layup tool relative to the compaction device as the compaction device compacts the composite charge on the layup surface such that a compaction force, applied to the composite charge by the compaction device, is normal to the layup surface.

15. The system of claim 14, wherein:
the tool-positioning device comprises:
a first actuator coupled to the layup tool at a first location; and
a second actuator coupled to the layup tool at a second location that is spaced away from the first location along the longitudinal tool-axis; and
the motion-control device is configured to selectively control coordinated motion of the first actuator and the second actuator to adjust an angular orientation and a location of the layup tool relative to the compaction device.

16. The system of claim 15, wherein each one of the first actuator and the second actuator comprises:
a first linear actuator configured to adjust a vertical location of the layup tool; and
a second linear actuator configured to adjust a horizontal location of the layup tool.

17. The system of claim 15, further comprising a conveyance device configured to move the separation device and the compaction device along the support surface,
wherein the conveyance device is further configured to vary a linear velocity at which the separation device and the compaction device move along the support surface based, at least in part, on a rotational velocity at which the layup tool rotates and a linear velocity at which the layup tool translates in response to coordinated motion of the first actuator and the second actuator.

18. The system of claim 14, wherein the layup tool is removable from the tool-positioning device.

19. The system of claim 14, further comprising a sheet-support mechanism configured to support the second sheet-portion, extending beyond the support-surface edge.

20. The system of claim 14, wherein the separation device comprises:

a cutter configured to cut the composite sheet; and
a cutter-positioning device configured to selectively adjust a cutting angle of the cutter relative to the composite sheet.

\* \* \* \* \*